(12) United States Patent
Cai et al.

(10) Patent No.: US 10,352,423 B2
(45) Date of Patent: Jul. 16, 2019

(54) HYDROKINETIC TORQUE COUPLING DEVICE WITH CENTERED FRICTION DISC

(71) Applicant: VALEO EMBRAYAGES, Amiens (FR)

(72) Inventors: Liguang Cai, Troy, MI (US); Sungchul Lee, Troy, MI (US); Zane Yang, Troy, MI (US)

(73) Assignee: Valeo Embrayages, Amiens (FR)

( * ) Notice: Subject to any disclaimer, the term of this patent is extended or adjusted under 35 U.S.C. 154(b) by 60 days.

(21) Appl. No.: 15/596,760

(22) Filed: May 16, 2017

(65) Prior Publication Data

US 2018/0335119 A1    Nov. 22, 2018

(51) Int. Cl.
*F16H 45/02*    (2006.01)
*F16H 61/14*    (2006.01)
*F16H 41/24*    (2006.01)

(52) U.S. Cl.
CPC .......... *F16H 45/02* (2013.01); *F16H 61/148* (2013.01); *F16H 2041/246* (2013.01); *F16H 2045/0252* (2013.01)

(58) Field of Classification Search
CPC .................. F16H 45/02; F16H 61/148; F16H 2045/0252; F16H 2041/246
See application file for complete search history.

(56) References Cited

U.S. PATENT DOCUMENTS

| | | | |
|---|---|---|---|
| 6,938,744 B2 | 9/2005 | Tomiyama | |
| 8,025,136 B2 | 9/2011 | Uhler | |
| 8,453,439 B2 | 6/2013 | Peri | |
| 2013/0233665 A1 | 9/2013 | Vanni et al. | |
| 2015/0308554 A1 | 10/2015 | Medellin et al. | |
| 2016/0377159 A1 | 12/2016 | Strom et al. | |
| 2017/0159782 A1* | 6/2017 | Smith | F16H 41/28 |
| 2017/0159784 A1* | 6/2017 | Basin | F16H 45/02 |
| 2017/0167586 A1* | 6/2017 | Smith | F16H 45/02 |
| 2017/0261083 A1* | 9/2017 | Hepler | F16H 45/02 |

* cited by examiner

*Primary Examiner* — David J Hlavka
(74) *Attorney, Agent, or Firm* — Berenato & White, LLC

(57) ABSTRACT

A hydrokinetic torque-coupling device for coupling driving and driven shafts. The torque-coupling device includes a casing having a locking surface, an impeller wheel and a turbine wheel hydrodynamically drivable by the impeller wheel, a lockup piston axially movable toward and away from the locking surface, a friction disc including a generally radially orientated friction ring and at least one driving tab, and a torsional vibration damper comprising the friction disc, elastic members and an engagement member elastically coupled to the friction disc through the elastic members. The friction ring has a radially outer peripheral surface defining a centering surface of the friction disc. The engagement member includes at least one centering tab extending toward the friction ring and having a centering surface disposed adjacent to and facing the centering surface of the friction disc to center the friction disc with respect to the engagement member of the torsional vibration damper.

20 Claims, 19 Drawing Sheets

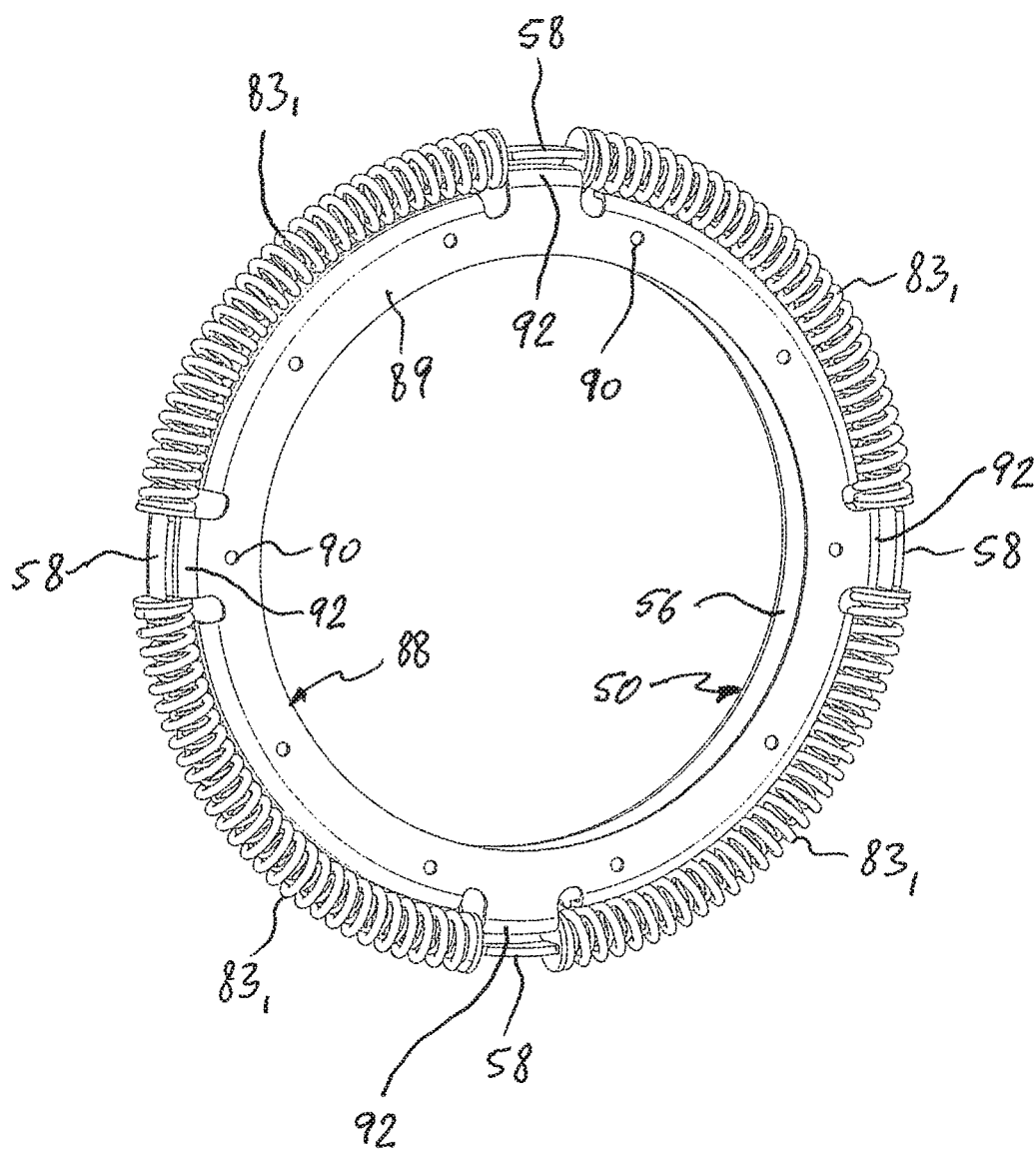

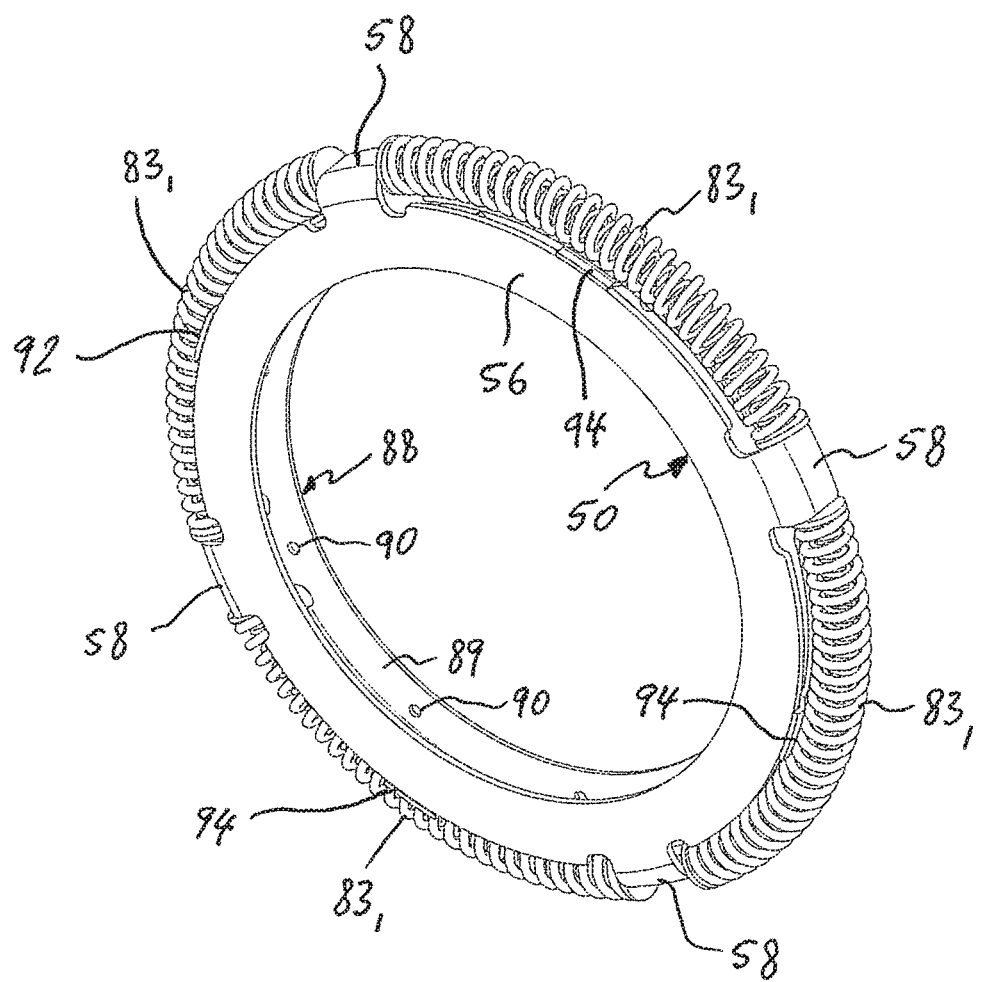

HYDROKINETIC TORQUE COUPLING DEVICE WITH CENTERED FRICTION DISC

FIELD OF THE INVENTION

This invention generally relates to hydrokinetic torque coupling devices and, more particularly, to hydrokinetic torque coupling devices including a lock-up clutch with a centered friction disc.

BACKGROUND OF THE INVENTION

In the evolution of automobiles from motorized carriages to highly regulated devices for mass transportation, there has been a continuous pursuit of refinement of the basic combination of elements that comprise the automobile. One aspect of this refinement has been the transmission of torque from the engine to the drive system of the vehicle. This transmission of torque has, throughout, been accomplished by various gear or chain driven transmission systems alternatively drivingly connected to, or disconnected from, a source of motive power. The connection/disconnection feature of the drive system is accomplished by means of a clutch. Since the mid-1950's, especially in the United States, this clutch has been a fluid clutch or torque converter. Owing to the inclusion of this fluid torque transmitting coupling, enhanced refinement of the driving experience was obtained, but this refinement came at the expense of lost efficiency. To address this lost efficiency, the torque converter has become, itself, an object of greater refinement and recaptured efficiency. Often times, a modern era torque converter will include a friction clutch assembly associated with a driven member of the torque converter which, at preset loads and speeds, eliminates the fluid transmission of torque and replaces the fluid coupling with a direct mechanical friction coupling. This feature is commonly referred to as a lock-up clutch.

In the era of the lock-up clutch equipped torque converter, efficiency has been recaptured, but a loss of refinement has also occurred when the clutch is in lock-up mode and when it is transitioning into and out of lock-up mode. This is especially true when the lock-up clutch elements become worn and tolerances between various rotating and fixed elements increase/decrease in accord with their respective wear patterns. To alleviate some of the mechanical coarseness created by the incorporation of lock-up clutches onto torque converters, the clutch systems, themselves, have increased in complexity. For example, the inclusion of a driven intermediate plate, and the further inclusion of elastic damping members to keep driveline torque oscillations within acceptable parameters, adds rotational mass and complexity to the torque converter sub-assemblies. This added complexity creates the potential for a loss of refinement through vibration caused, in part, by unbalanced decentered rotation of the various components. In addition, it is common for the elastic torque transmitting member equipped devices to, over time and with use, develop rattles and other noises that create a perception of low integrity of the torque converter device. In addition, the assembly of these increasingly complex clutch and damper systems requires more time, patience, and precision. Examples of such torque converters equipped with a lock-up clutch and elastic torque transmission element through an intermediate plate are shown in U.S. Pat. Nos. 8,453,439; 8,025,136; and 6,938,744.

While conventional hydrokinetic torque-coupling devices, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque-coupling device for coupling a driving shaft and a driven shaft together. The torque-coupling device comprises a casing rotatable about a rotational axis and having a locking surface, an impeller wheel coaxially aligned with the rotational axis and comprising an impeller shell and impeller blades fixedly attached to the impeller shell, a turbine wheel coaxially aligned with and hydrodynamically drivable by the impeller wheel, a lockup piston axially movable toward and away from the locking surface of the casing to position the hydrokinetic torque coupling device into and out of a lockup mode, a friction disc axially moveable along the rotational axis to and from the locking surface of the casing, and a torsional vibration damper comprising an input member in the form of the friction disc, a plurality of circumferentially acting first torque transmitting elastic members and an engagement member elastically coupled to the friction disc through the first torque transmitting elastic members. The turbine wheel comprises a turbine shell and turbine blades fixedly attached to the turbine shell. The friction disc includes a generally radially orientated friction ring disposed axially between the lockup piston and the locking surface of the casing, and at least one driving tab. The friction ring of the friction disc has a radially outer peripheral surface defining a centering surface of the friction disc. The engagement member includes at least one centering tab extending toward the friction ring of the friction disc and having a centering surface disposed adjacent to and facing the centering surface of the friction disc to center the friction disc with respect to the engagement member of the torsional vibration damper.

According to a second aspect of the present invention, there is provided a method for assembling a hydrokinetic torque-coupling device for coupling together a driving shaft and a driven shaft. The method involves the steps of providing a friction disc including a generally radially orientated friction ring and at least one driving tab, the friction ring of the friction disc having a radially outer peripheral surface defining a centering surface of the friction disc, providing a plurality of circumferentially acting first torque transmitting elastic members and an engagement member including at least one centering tab extending toward the friction ring of the friction disc and having a centering surface, mounting the first torque transmitting elastic members between the friction disc and the engagement member so that the at least one driving tab of the friction disc being elastically coupled to the engagement member through the first torque transmitting elastic members, and centering the friction disc with respect to the engagement member by positioning the centering surface of the at least one centering tab of the engagement member adjacent to and facing the centering surface of the friction disc.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

FIG. 9A is a perspective view of the engagement member and circumferentially acting first torque transmitting elastic members of the torsional vibration damper, and the friction disc in accordance with the first exemplary embodiment of the present invention from one side;

FIG. 9B is a perspective view of the engagement member and circumferentially acting first torque transmitting elastic members of the torsional vibration damper, and the friction disc in accordance with the first exemplary embodiment of the present invention from axially opposite side;

Figure 1:
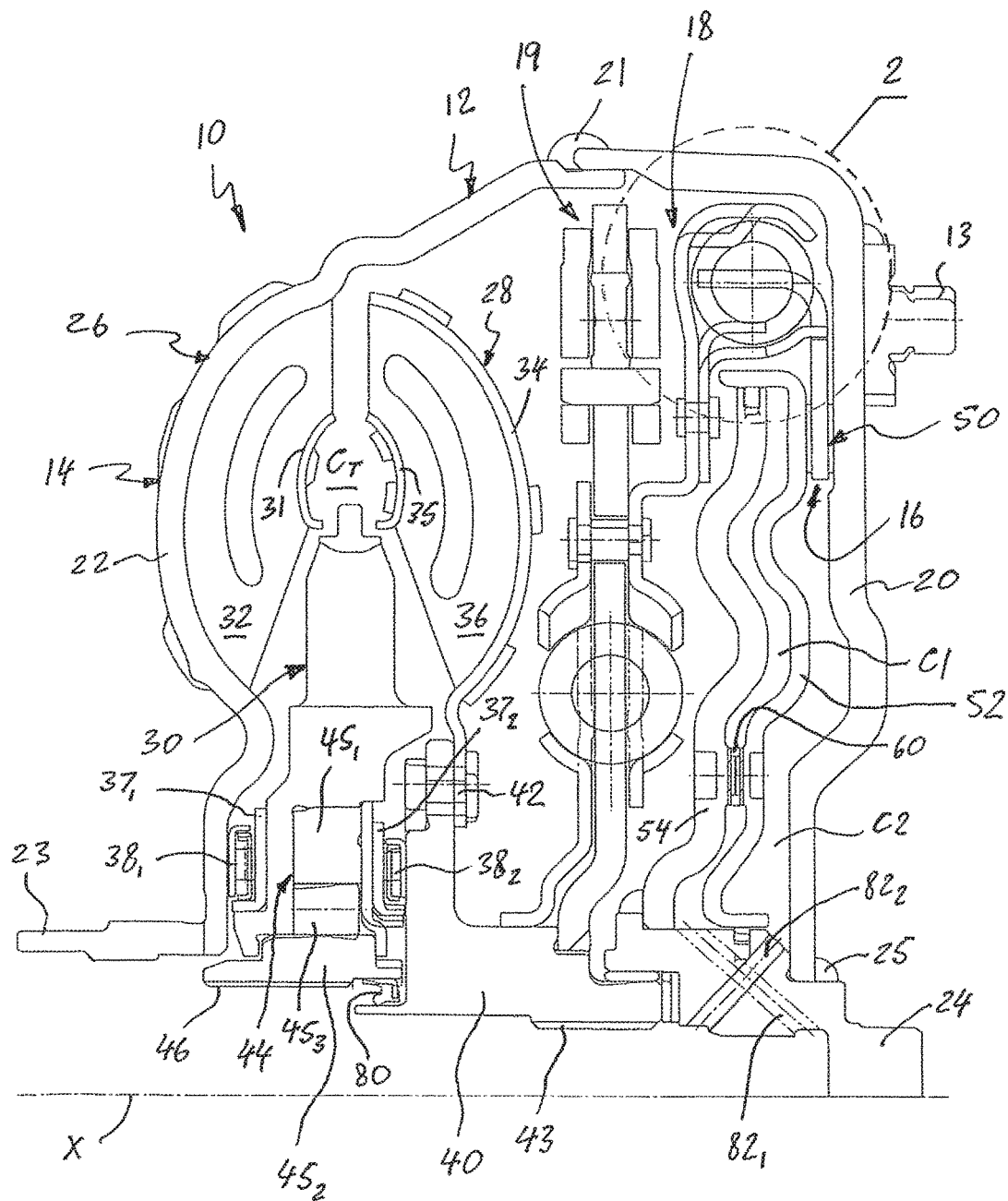
FIG. 1 is a sectional view of a hydrokinetic torque-coupling device in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiment(s) and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 2:
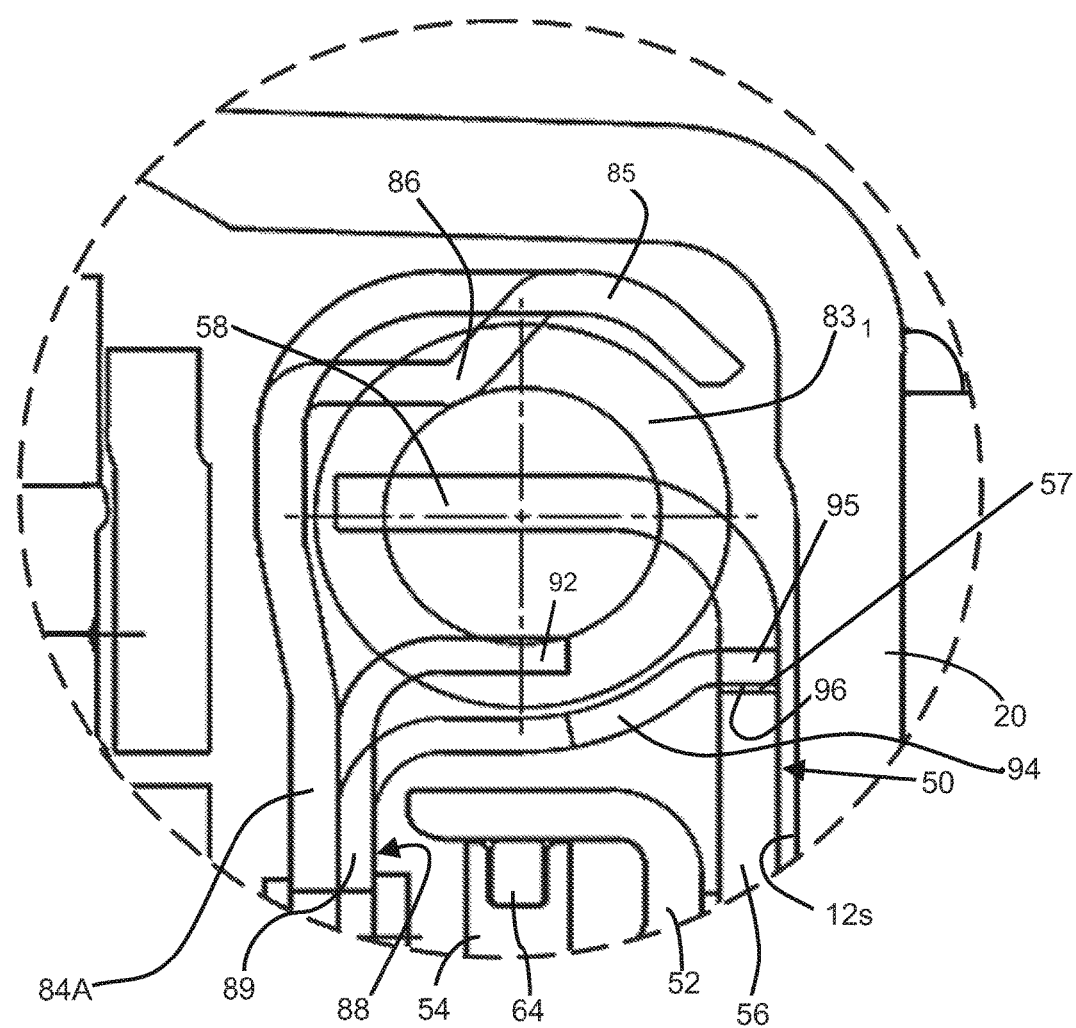
FIG. 2 is an enlarged view of a fragment of the hydrokinetic torque-coupling device shown in the circle "2" of FIG. 1.

A hydrokinetic torque-coupling device in accordance with a first exemplary embodiment of the present invention is generally represented in the accompanying drawings by reference numeral 10, as best shown in FIGS. 1 and 2. The hydrokinetic torque-coupling device 10 is intended to couple a driving and a driven shaft (not shown), for example in a motor vehicle. In this case, the driving shaft is an output shaft of an internal combustion engine (ICE) (not shown) of the motor vehicle and the driven shaft is an input shaft of an automatic transmission of the motor vehicle.

The hydrokinetic torque-coupling device 10 comprises a sealed casing 12 filled with a fluid, such as oil or transmission fluid, and rotatable about a rotational axis X, a hydrokinetic torque converter 14, a lock-up clutch 16 and an elastic damping device (or torsional vibration damper) 18. Hereinafter the axial and radial orientations are considered with respect to the rotational axis X of the torque-coupling device 10. Both the lock-up clutch 16 and the torsional vibration damper 18 are disposed in the casing 12.

The sealed casing 12, the torque converter 14, the lock-up clutch 16 and the torsional vibration damper 18 are all rotatable about the rotational axis X. The drawings discussed herein show half-views, that is, a cross-section of the portion or fragment of the hydrokinetic torque-coupling device 10 above the rotational axis X. As is known in the art, the torque-coupling device 10 is symmetrical about the rotational axis X. The relative terms such as "axially," "radially," and "circumferentially" are with respect to orientations parallel to, perpendicular to, and circularly (or angularly) around the rotational axis X, respectively.

The sealed casing 12 according to the first exemplary embodiment as illustrated in FIG. 1 includes a first shell (or cover shell) 20, and a second shell (or impeller shell) 22 disposed coaxially with and axially opposite to the first shell 20. The first and second shells 20, 22 are non-movably (i.e., fixedly) interconnected and sealed together about their outer peripheries, such as by weld 21. The first shell 20 is non-movably (i.e., fixedly) connected to the driving shaft, more typically to the output shaft of the ICE through a flexplate that is non-rotatably fixed to the driving shaft, so that the casing 12 turns at the same speed at which the engine operates for transmitting torque. Specifically, in the illustrated embodiment of FIG. 1, the casing 12 is rotatably driven by the ICE and is non-rotatably coupled to the driving shaft thereof, such as with studs 13 through the flexplate. Typically, the studs 13 are fixedly secured, such as by welding, to the first shell 20. Each of the first and second shells 20, 22 are integral or one-piece and may be made, for example, by press-forming one-piece metal sheets.

The casing 12 further includes an annular center hub 24 non-moveably attached (i.e., fixed) to a radially inner end of the cover shell 20, such as by weld 25. The center hub 24 is configured to center the cover shell 20 during the assembly of the torque-coupling device 10.

The torque converter 14 comprises an impeller wheel (sometimes referred to as the pump, impeller assembly or impeller) 26, a turbine wheel (sometimes referred to as the turbine assembly or turbine) 28, and a stator (sometimes referred to as the reactor) 30 interposed axially between the impeller wheel 26 and the turbine wheel 28. The impeller wheel 26, the turbine wheel 28, and the stator 30 are coaxially aligned with one another and the rotational axis X. The impeller wheel 26, the turbine wheel 28, and the stator 30 collectively form a torus. The impeller wheel 26 and the turbine wheel 28 may be fluidly coupled to one another in operation as known in the art. In other words, the turbine wheel 28 is hydro-dynamically drivable by the impeller wheel 26.

The impeller wheel 26 comprises the impeller shell 22, an annular (or cylindrical) impeller hub 23 fixedly (i.e., non-moveably) attached to the impeller shell 22, a substantially annular impeller core ring 31, and a plurality of impeller blades 32 fixedly (i.e., non-moveably) attached, such as by brazing, to the impeller shell 22 and the impeller core ring 31. The impeller shell 22 is an integral (or unitary) component, e.g., made of a single part or separate components fixedly connected together.

The turbine wheel 28, as best shown in FIG. 1, comprises a substantially annular, semi-toroidal (or concave) turbine shell 34 rotatable about the rotational axis X, a substantially annular turbine core ring 35, and a plurality of turbine blades 36 fixedly (i.e., non-moveably) attached, such as by brazing, to the turbine shell 34 and the turbine core ring 35. The turbine shell 34, the turbine core ring 35 and the turbine blades 36 are conventionally formed by stamping from steel blanks. The impeller shell 22 and the turbine shell 34 collectively define a substantially toroidal inner chamber (or torus chamber) $C_T$ therebetween.

The stator 30 is positioned between the impeller wheel 26 and the turbine wheel 28 to redirect fluid from the turbine wheel 28 back to the impeller wheel 26 in an efficient manner. The stator 30 is typically mounted on a one-way (or overrunning) clutch 44 to prevent the stator 30 from counter-rotation. A first thrust bearing $38_1$ is interposed between a first side bearing ring $37_1$ of the stator 30 and the impeller shell 22 of the casing 12, while a second thrust bearing $38_2$ is interposed between a second side bearing ring $37_2$ of the stator 30 and the turbine shell 34.

The turbine wheel 28 is non-rotatably secured to a turbine (or output) hub 40 by appropriate means, such as by rivets 42 or welding. The turbine hub 40 is non-rotatably coupled to the driven shaft with splines 43. The turbine hub 40 is rotatable about the rotational axis X and is coaxial with the driven shaft so as to center the turbine wheel 28 on the driven shaft. Conventionally, the turbine blades 36 of the turbine wheel 28 interact, in a known manner, with the impeller blades 32 of the impeller wheel 26. The stator 30 is coupled in rotation to a stationary stator shaft through the one-way (or overrunning) clutch 44.

The stator 30 is non-rotatably coupled to the stator shaft 4 through the one-way clutch 44. At low turbine shaft speeds, the impeller wheel 26 causes hydraulic fluid to flow from the impeller wheel 26 to the turbine wheel 28, and flow back to the impeller wheel 26 through the stator 30, providing a first power flow path. The stator 30 is held against rotation by the one-way clutch 44 such that it can redirect the fluid flow and provide a reaction torque for torque multiplication. The one-way clutch 44 permits rotation of the stator 30 in one direction only. In other words, the stator 30 is mounted on the one-way clutch 44 to prevent the stator 30 from counter-rotation.

The one-way clutch 44 includes an outer ring $45_1$ mounted within a central stator hub bore coaxially with the rotational axis X, an inner ring $45_2$ coaxial to the rotational axis X, and a plurality of sprags or rockers $45_3$ circumferentially disposed in an annular space defined between the outer ring $45_1$ and the inner ring $45_2$. The rockers $45_3$ permit rotation of the stator 30 in one direction and prevent rotation of the stator 30 in the other direction. The one-way clutch 44 is supported to rotate with respect to the stationary shaft. The stationary shaft is adapted to be fixed to a front support of a transmission. An inner peripheral surface of the inner ring $45_2$ has splines 46 for non-rotatably coupling to a radially outer periphery of the stator shaft 4. In other words, the inner ring $45_2$ is splined to the stationary stator shaft.

The lock-up clutch 16 of the torque-coupling device 10 includes a friction disc 50, a generally annular lockup piston (or pressure plate) 52, both axially movable to and from the cover shell 20, and an annular piston housing member 54 that is non-moveably attached (i.e., fixed) to the center hub 24 of the cover shell 20 and axially spaced from the cover shell 20 so that the lockup piston 52 is disposed between the piston housing member 54 and the cover shell 20. The friction disc 50 is axially moveable along the rotational axis X to and from a locking surface 12s defined on the cover shell 20 of the casing 12, as best shown in FIG. 2. The friction disc 50 is axially moveable along the rotational axis X so as to selectively engage the friction disc 50 against the locking surface 12s of the casing 12. The lockup piston 52 is mounted to the center hub 24 so as to be rotatable relative thereto an. Moreover, the lockup piston 52 is axially moveable along the center hub 24. The lockup piston 52 is non-rotatably coupled to the piston housing member 54, such as by means of a set of elastic tongues 60, which are arranged substantially on one circumference, and which are oriented tangentially between the piston housing member 54 and the lockup piston 52, while permitting relative axial displacement thereof.

Figure 6:
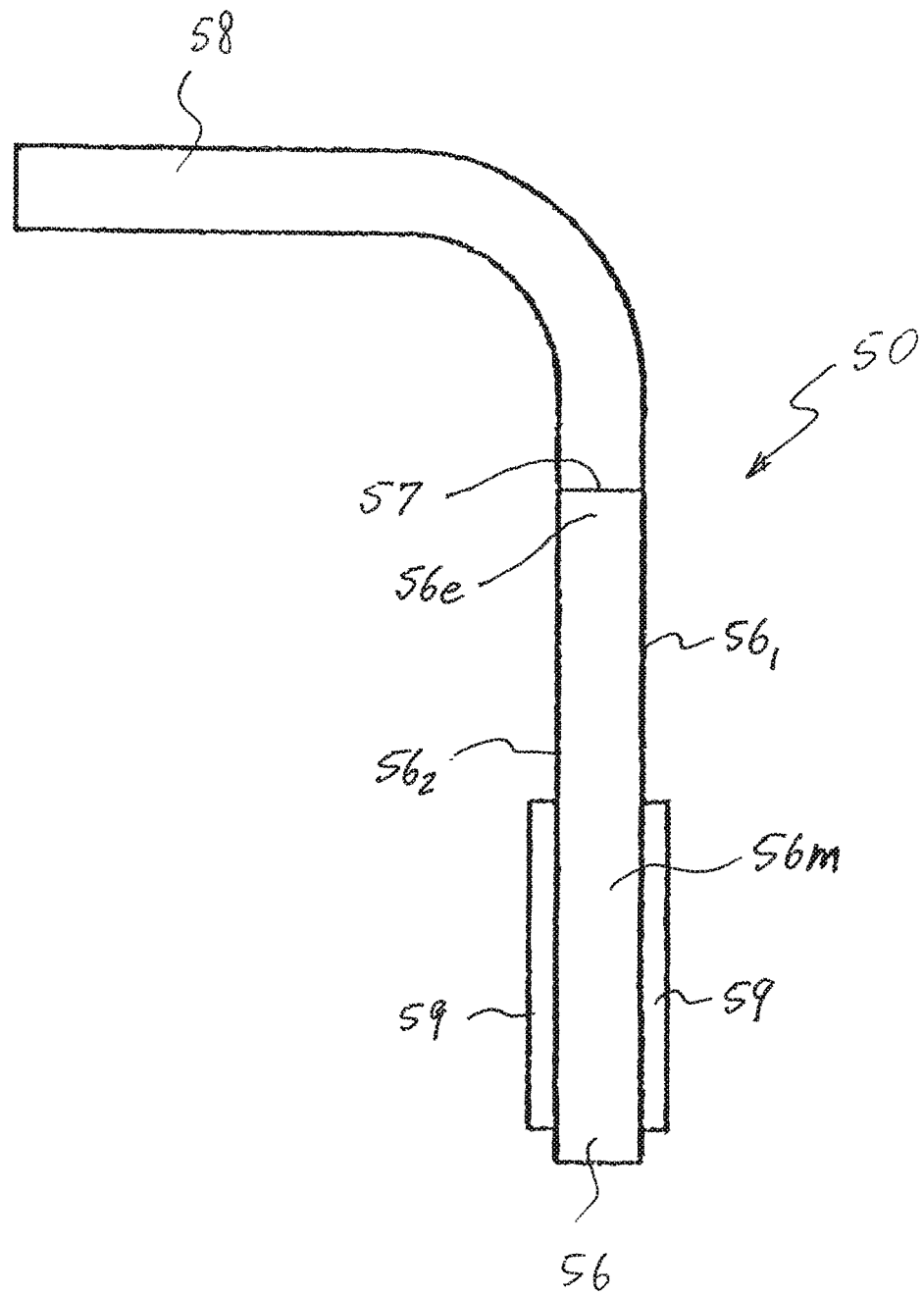
FIG. 6 is a sectional view of the friction disc in accordance with the first exemplary embodiment of the present invention.

The friction disc 50 includes a generally radially orientated friction portion (or friction ring) 56 and one or more driving tabs (or abutment elements) 58 extending axially outwardly from the friction portion 56 of the friction disc 50. Moreover, the driving tabs 58 are equiangularly and equidistantly spaced from each other. The friction portion 56 of the first exemplary embodiment includes an annular main portion 56m and a radially outer end 56e. As best shown in FIG. 6, the main portion 56m of the friction portion 56 of the first exemplary embodiment is in the form of a flat (i.e., planar) annular ring. The friction disc 50 with the friction portion 56 and the driving tabs 58 is preferably an integral (or unitary) part, e.g., made of a single or unitary component, but may be separate components fixedly connected together. Preferably, the driving tabs 58 are integrally press-formed on the friction disc 50.

The main portion 56m of the annular friction portion 56 of the friction disc 50 has axially opposite first and second friction faces $56_1$ and $56_2$, respectively, as best shown in FIG. 6. The first friction face $56_1$ of the friction disc 50 (defining an engagement surface of the friction disc 50) faces the locking surface 12s defined on the cover shell 20 of the casing 12. An annular friction liner 59 is attached to each of the first and second friction faces $56_1$ and $56_2$ of the friction disc 50, such as by adhesive bonding, as best shown in FIG. 6.

Figure 7:
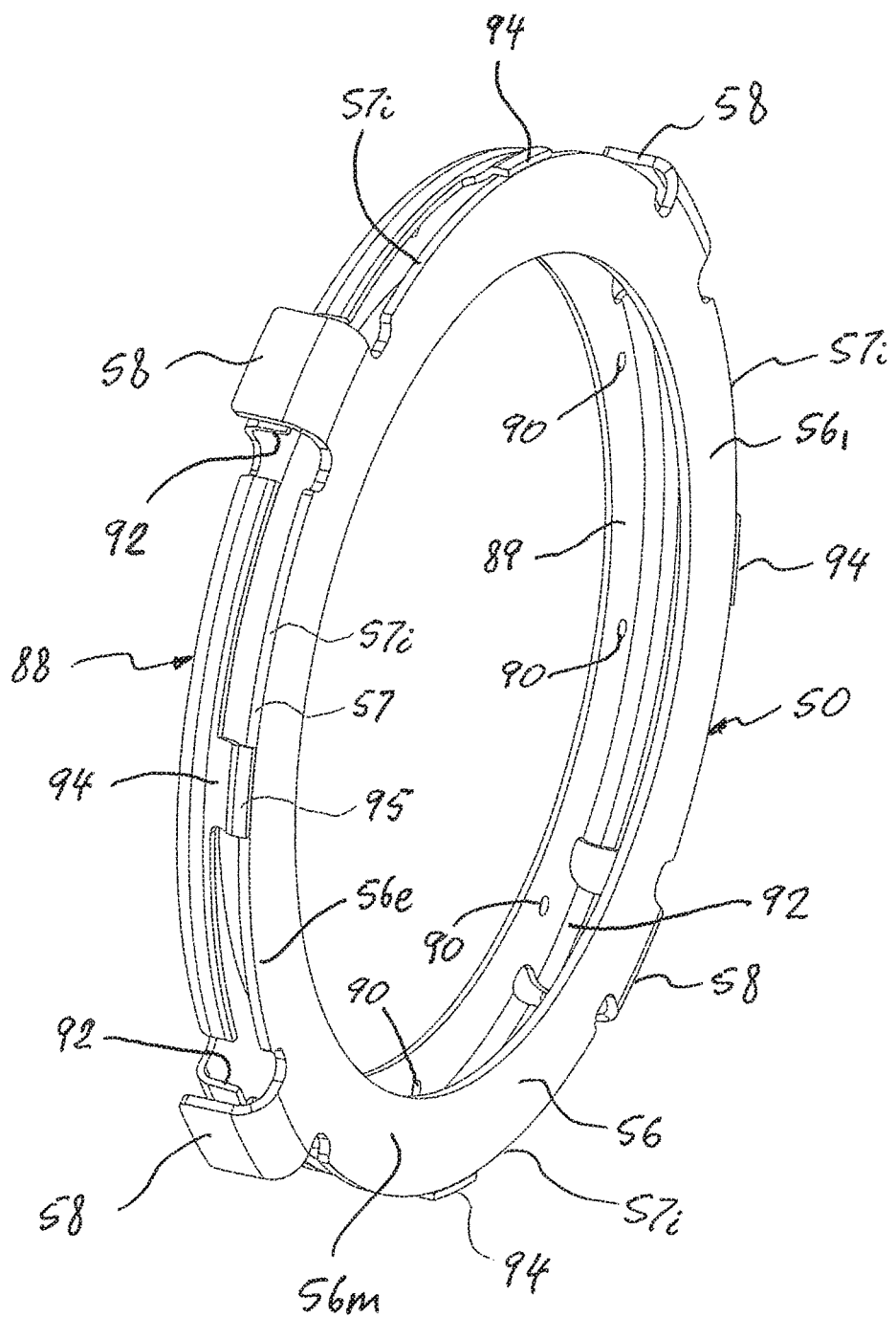
FIG. 7 is a perspective view of an engagement member of the torsional vibration damper and the friction disc in accordance with the first exemplary embodiment of the present invention.
Figure 8:
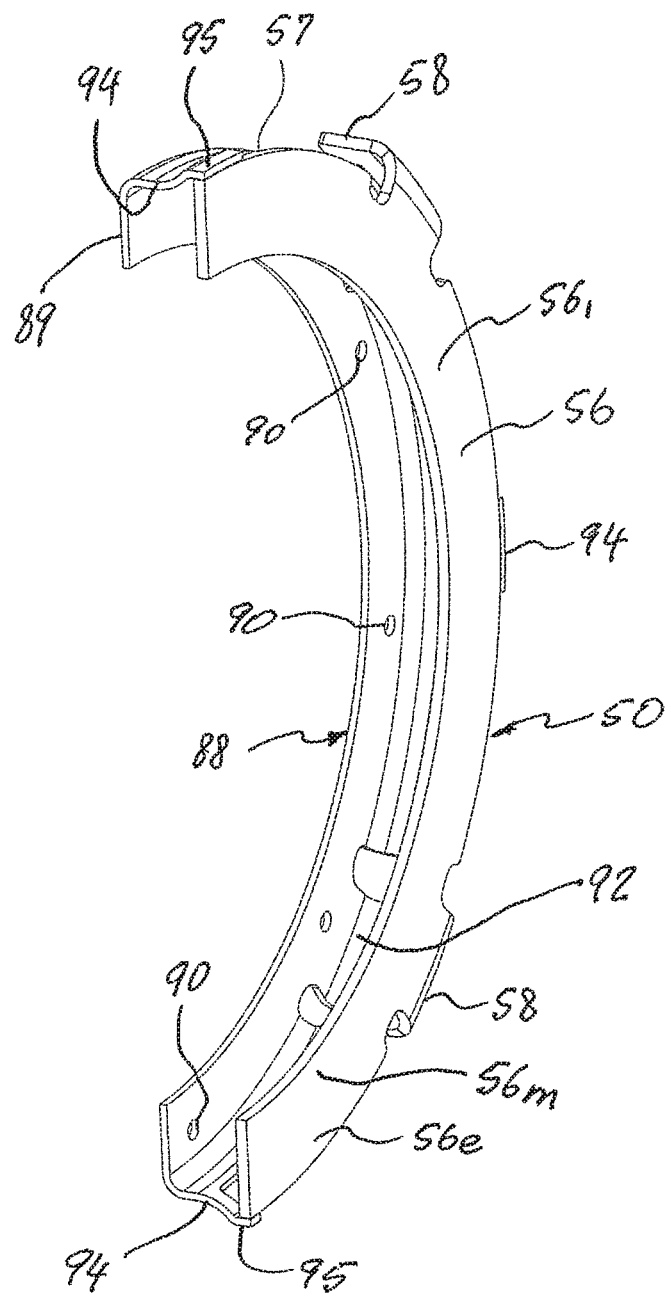
FIG. 8 is a partial perspective view of the engagement member of the torsional vibration damper and the friction disc in accordance with the first exemplary embodiment of the present invention.

As best shown in FIG. 6, the radially outer end 56e of the friction ring 56 is coplanar with the main portion 56m of the friction ring 56. In other words, the axially opposite faces of the radially outer end 56e of the friction ring 56 are coplanar with the axially opposite first and second friction faces $56_1$ and $56_2$ of the main portion 56m of the friction ring 56. As best shown in FIGS. 6-8, a radially outer end 56e of the friction ring 56 of the friction disc 50 has an annular (e.g., substantially cylindrical), radially outer peripheral surfaces 57, which defines a centering surface of the friction disc 50. The centering surface 57 of the friction disc 50 is interrupted by the driving tabs 58. In fact, the centering surface 57 of the friction disc 50 is defined by a number (four in the first exemplary embodiment of the present invention) of cylindrical or conical segments 57i, best shown in FIG. 7.

The lock-up clutch 16 of the torque-coupling device 10 is placed between the torsional vibration damper 18 and the cover shell 20. The torsional vibration damper 18 includes an input (or drive) member in the form of the friction disc 50, a plurality of circumferentially acting first torque transmitting (or damper) elastic members (springs) $83_1$, an intermediate member 84 elastically coupled to the driving tabs 58 of the friction disc 50 through the first elastic members $83_1$, a plurality of circumferentially acting second torque transmitting (or damper) elastic members (springs) $83_2$, and an output (or driven) member 33 elastically coupled to the intermediate member 84 through the second elastic members $83_2$. The output member 33 is non-rotatably coupled to the turbine hub 40, such as by welding 47 (best shown in FIGS. 3-5).

Figure 3:
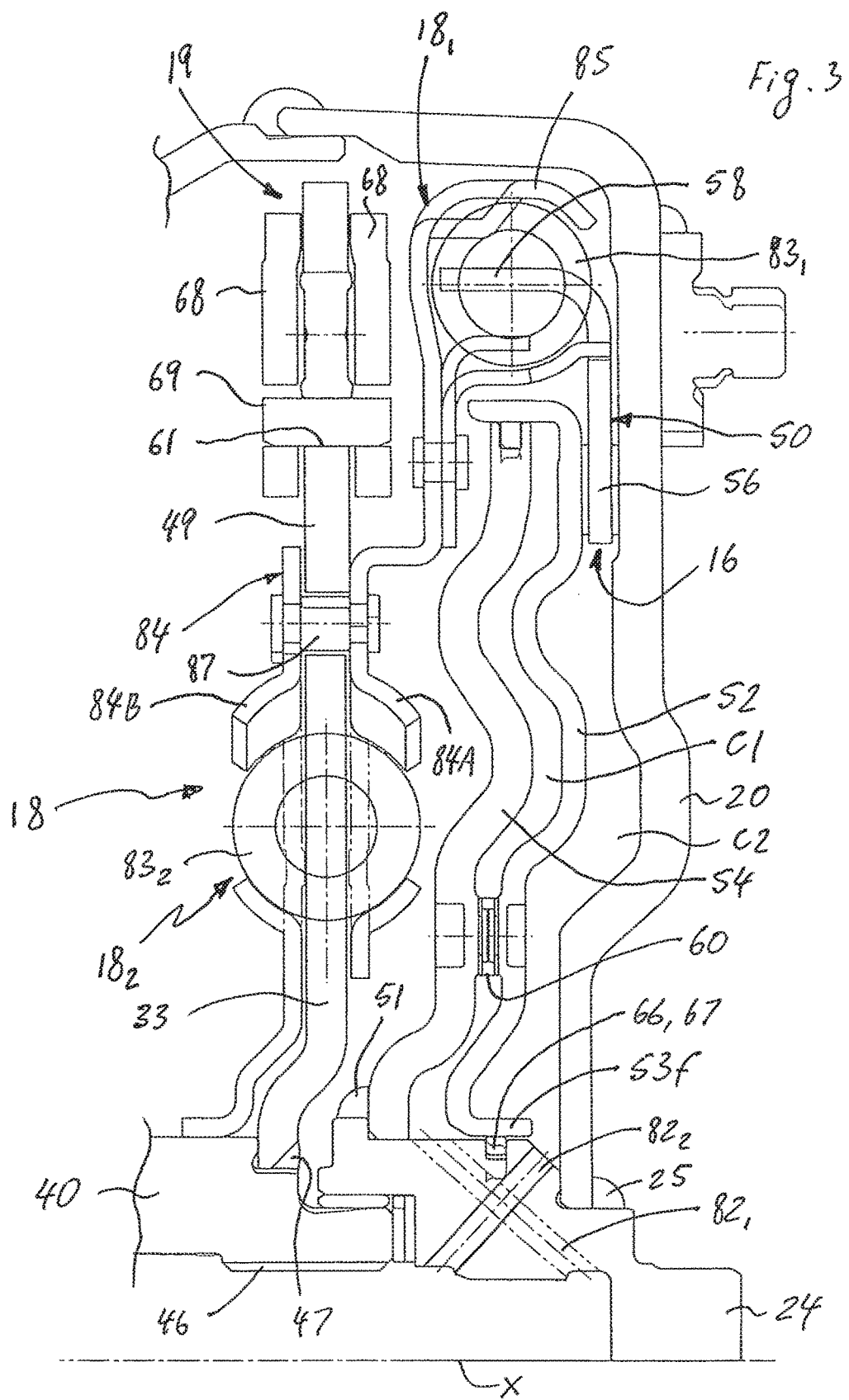
FIG. 3 is a partial sectional view of the hydrokinetic torque-coupling device in accordance with the first exemplary embodiment of the present invention without a torque converter.
Figure 4:
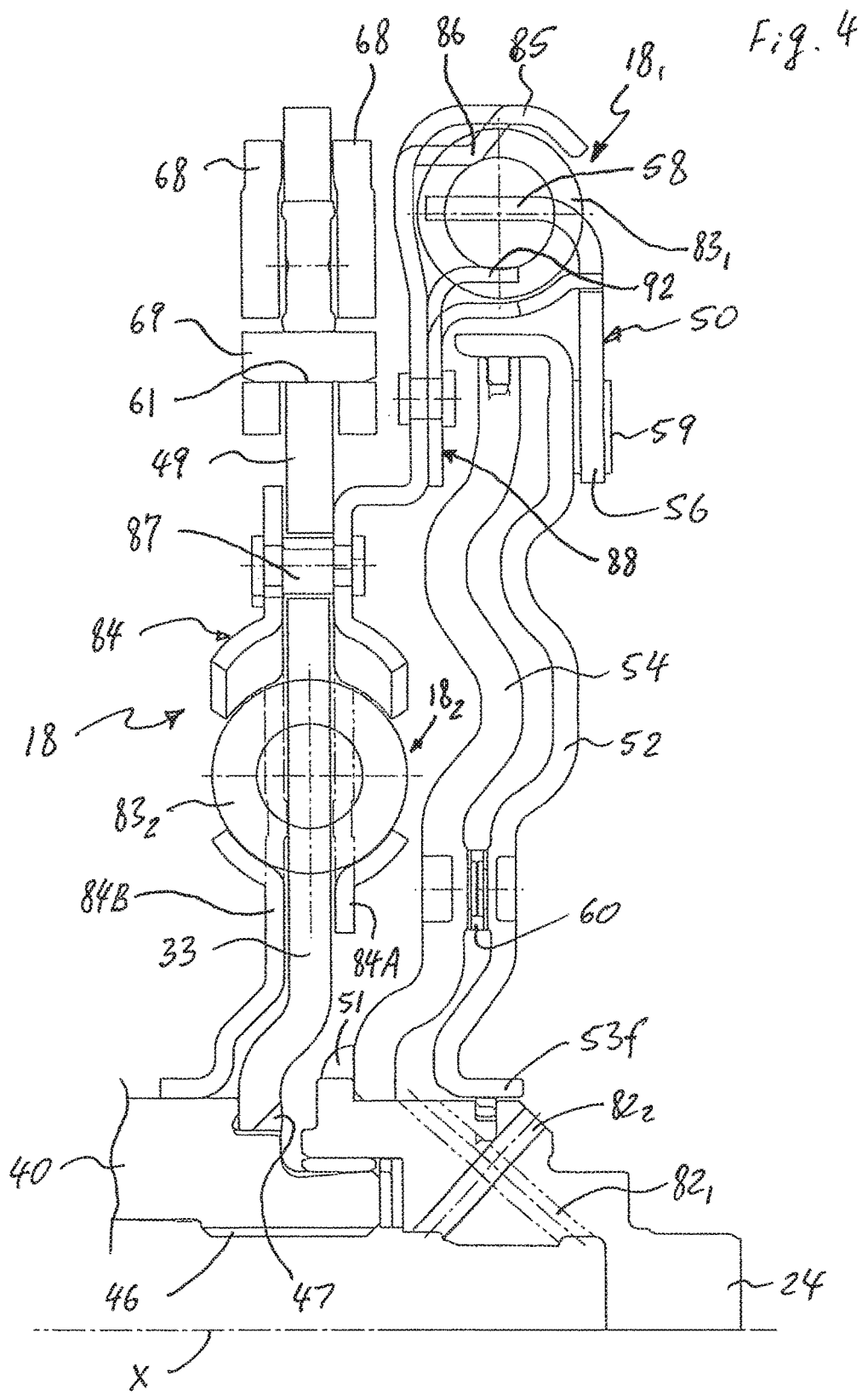
FIG. 4 is a partial sectional view of the hydrokinetic torque coupling device in accordance with the first exemplary embodiment of the present invention, showing a torsional vibration damper and a lockup clutch without a casing.

According to the exemplary embodiment of the present invention, each of the first and second torque transmitting elastic members $83_1$ and $83_2$ is in the form of helical (or coil) spring having a principal axis oriented substantially circumferentially. Furthermore according to the exemplary embodiment of the present invention, each of the damper elastic members $83_1$ or $83_2$ includes only one coaxial helical spring. Alternatively, each of the damper elastic members $83_1$ or $83_2$ may include a pair of coaxial helical springs, for example, an external large-diameter spring and an internal small-diameter spring, arranged coaxially so that the internal spring is disposed within the external spring. The first elastic members $83_1$ (also referred to herein as radially outer damper elastic members) are disposed in series relative to each other between the input member 50 and the intermediate member 84, while the second elastic members $83_2$ (also referred to herein as radially inner damper elastic members) are disposed in series relative to each other between the intermediate member 84 and the output member 33, as best shown in FIGS. 3 and 4. Thus, the friction disc 50, the first elastic members $83_1$ and the intermediate member 84 together define a first torsional vibration damper assembly $18_1$, while the intermediate member 84, the second elastic members $83_2$ and the driven member 33 together define a second torsional vibration damper assembly $18_2$. The first and second torsional vibration damper assemblies $18_1$ and $18_2$ together define the torsional vibration damper 18. Moreover, the intermediate member 84 acts as an output element of the first torsional vibration damper assembly $18_1$, and an input element of the second torsional vibration damper assembly $18_2$.

Figure 5:
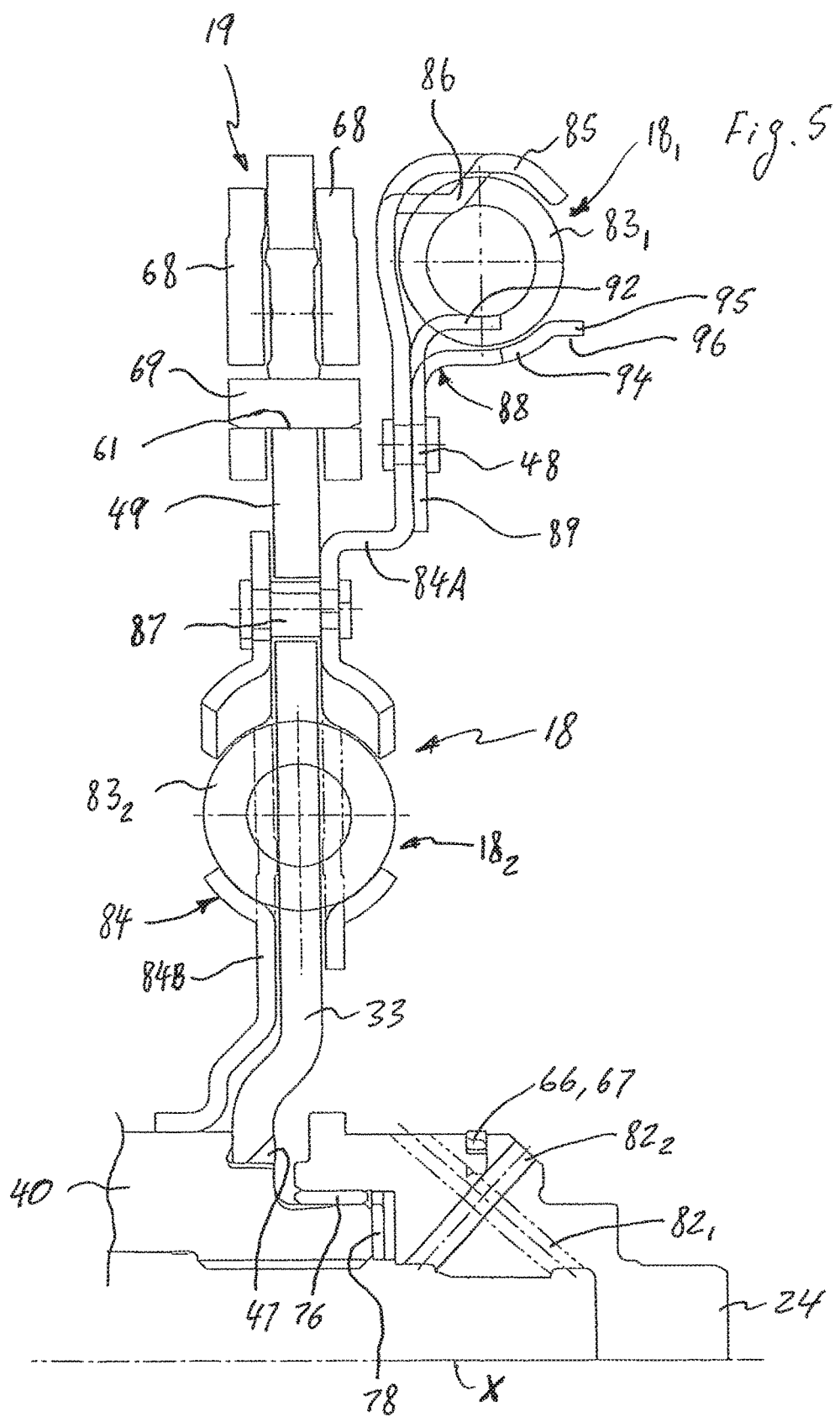
FIG. 5 is a partial sectional view of the hydrokinetic torque coupling device in accordance with the first exemplary embodiment of the present invention, showing a torsional vibration damper and a lockup clutch without a casing and a friction disc.

The intermediate member 84 includes a substantially annular first retainer plate 84A, and a substantially annular second retainer plate 84B disposed axially opposite the first retainer plate 84A, as best shown in FIGS. 3-5. The first and second retainer plates 84A, 84B are mounted adjacent to axially opposite sides (surfaces) of the driven member 33 so as to be oriented parallel to each other and coaxially with the rotational axis X. The first and second retainer plates 84A, 84B are non-movably (i.e., fixedly) secured to one another by appropriate means, such as by fasteners (e.g., rivets 87) or welding, so as to be rotatable relative to the output member 33. Thus, the first and second retainer plates 84A, 84B are non-rotatable relative to one another, but rotatable relative to the output member 33 and the input member 50. Moreover, the second elastic members $83_2$ are disposed circumferentially in series between the output member 33 and the intermediate member 84 (i.e., the first and second retainer plates 84A, 84B). Specifically, the second elastic members $83_2$ are interposed axially between the first and second retainer plates 84A, 84B. In other words, the intermediate member 84 at least partially houses the second elastic members $83_2$ so as to radially support the second elastic members $83_2$.

As best shown in FIGS. 2-5, the first retainer plate 84A includes a retainer member 85 defining a radially outer end portion of the first retainer plate 84A. The retainer member 85 is provided with one or more abutment elements 86. According to the exemplary embodiment of the present invention, the retainer member 85 is integrally press-formed with the first retainer plate 84A. The retainer member 85 is disposed radially outside of the first elastic members $83_1$ so as to at least partially house the first elastic members $83_1$ within the retainer member 85. The abutment elements 86 are integrally press-formed with the retainer member 85 of the first retainer plate 84A so as to be equiangularly spaced from each other. The abutment elements 86 have circumferentially opposite abutment surfaces on circumferential ends of the mutually facing abutment elements 86.

The intermediate member 84 of the torsional vibration damper 18 further includes an engagement member 88 non-moveably attached (i.e., fixed) to the first retainer plate 84A. The engagement member 88 includes a generally annular, radially orientated plate portion 89, one or more driven tabs (or abutment elements) 92 extending axially outwardly from the plate portion 89 of the engagement member 88 toward the friction portion 56 of the friction disc 50, and one or more centering tabs 94 also extending axially outwardly from the plate portion 89 of the engagement member 88 toward the friction portion 56 of the friction disc 50. As best shown in FIG. 5, the centering tabs 94 are disposed radially inside the driven tabs 92. Moreover, the driven tabs 92 are angularly spaced from the centering tabs 94, as best shown in FIGS. 7 and 8. Also, the driven tabs 92 (four according to the exemplary embodiment of the present invention) are equiangularly and equidistantly spaced from each other. Similarly, the centering tabs 94 (four according to the exemplary embodiment of the present invention) are also equiangularly and equidistantly spaced from each other. The driven tabs 92 of the engagement member 88 are configured to engage ends of the first elastic members $83_1$. The plate portion 89 of the engagement member 88 of the first exemplary embodiment is in the form of a flat (i.e., planar) annular ring oriented substantially radially.

The plate portion 89 of the engagement member 88 is non-moveably attached (i.e., fixed) to the first retainer plate 84A by appropriate means, such as by rivets 48 or welding, as best shown in FIG. 5. The rivets 48 axially extend through holes 90 formed in the plate portion 89 of the engagement member 88, as illustrated in FIGS. 7, 8, 9A and 9B, and complementary holes in the first retainer plate 84A of the intermediate member 84. Thus, the abutment elements 86 of the first retainer plate 84A and the driven tabs 92 of the engagement member 88 are non-rotatable relative to one another, but rotatable relative to the input member 50.

As illustrated in FIGS. 3-4, the first elastic members $83_1$ are disposed circumferentially in series between the driving tabs 58 of the friction disc 50 and the abutment elements 86 of the first retainer plate 84A of the intermediate member 84. Also, the first elastic members $83_1$ are disposed circumferentially in series between the driving tabs 58 of the friction disc 50 and the driven tabs 92 of the engagement member 88 of the intermediate member 84, as illustrated in FIGS. 3, 4, 7, 9A and 9B.

Accordingly, the friction disc 50 is elastically coupled to the engagement member 88 of the first retainer plate 84A through the first elastic members $83_1$. In other words, the friction disc 50 is rotatable relative to the first retainer plate 84A, i.e., the intermediate member 84. The centering tabs 94 of the engagement member 88 also act as stop elements limiting angular movement (i.e., rotation) of the friction disc 50 relative to the first retainer plate 84A of the intermediate member 84, and vice versa. In this way, the friction disc 50 may rotate relative to the first retainer plate 84A of the intermediate member 84 until at least one of the driving tabs 58 of the friction disc 50 engages (contacts) at least one of the centering tabs 94 of the engagement member 88 of the intermediate member 84. Moreover, as best illustrated in FIGS. 2, 5 and 9B, the centering tabs 94 radially support the first elastic members $83_1$.

As best shown in FIGS. 2, 5, 7 and 8, each of the centering tabs 94 of the engagement member 88 has a free, axially outermost distal end 95 adjacent to the centering surface 57 of the friction disc 50. The free distal end 95 of each of the centering tabs 94 has a radially inner peripheral surface 96, best shown in FIGS. 2 and 5, adjacent to and facing the centering surface 57 of the friction disc 50, as illustrated in FIGS. 2, 7 and 8. Moreover, the radially inner surface 96 of the free distal end 95 of each of the centering tabs 94 is complementary to the centering surface 57 of the friction disc 50. Thus, the radially inner peripheral surface 96 of the free distal end 95 of each of the centering tabs 94 defines a centering surface for each of the centering tabs 94. When the friction disc 50 rotates above a certain speed, the centering surface 57 of the friction disc 50 contact the radially inner surface 96 of the free distal end 95 of each of the centering tabs 94, thus centering the friction disc 50 with respect to the intermediate member 84 of the torsional vibration damper 18.

The torsional vibration damper 18 further includes a pendulum oscillator 19, which in turn includes a substantially annular support plate 49 and at least one pair of (i.e., first and second) pendulum flyweights 68 (or mass) pivotally mounted to the support plate 49. The annular support plate 49 is disposed axially between the first and second retainer plates 84A, 84B, as best shown in FIGS. 3-5, and is non-movably (i.e., fixedly) secured to the intermediate member 84 (i.e., the first and second retainer plates 84A, 84B) by appropriate means, such as by the fasteners 87 or welding, so as to be non-rotatable relative to the first and second retainer plates 84A, 84B.

The first and second pendulum masses 68 are arranged (mounted) axially on axially opposite sides of the support plate 49. The first and second flyweights 68 are connected axially to one another by at least one connecting member 69 passing axially through an associated opening 61 in a radially outer end of the support plate 49. According to the exemplary embodiment, the pendulum oscillator 19 includes three pairs of the first and second flyweights 68, and each pair of the first and second flyweights 68 is connected axially to one another by two connecting members 69 passing axially through the associated openings 61 in the support plate 49. The pendulum oscillator 19 may include one or more pairs of the first and second flyweights 68. In the illustrated embodiment of FIGS. 3-5, the first and second flyweights 68 are substantially structurally and functionally identical.

The first and second flyweights 68 are configured to oscillate with respect to the support plate 49 in a rotation plane orthogonal to the rotational axis X. Accordingly, in reaction to rotational irregularities of the ICE, each of the first and second flyweights 68 shifts so that a center of mass thereof oscillates in pendulum fashion. The oscillation frequency of each of the first and second flyweights 68 is proportional to the rotational speed of the crankshaft of the ICE. This pendulum motion of the first and second flyweights 68 allows vibrations and rotational irregularities of the engine to be damped and absorbed.

Figure 10:
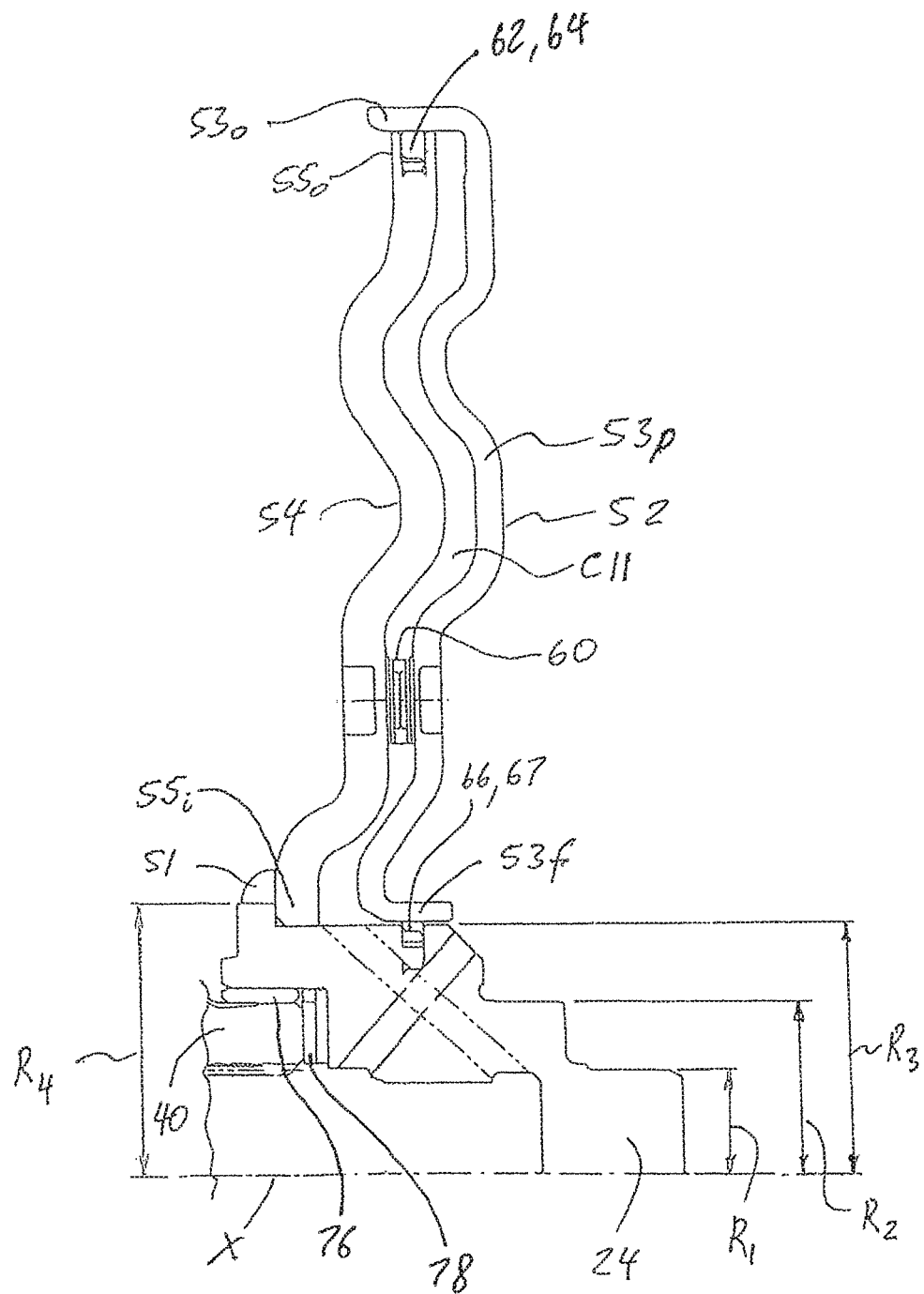
FIG. 10 is a partial sectional view of the hydrokinetic torque coupling device in accordance with the first exemplary embodiment of the present invention, showing a lockup piston and a piston housing member mounted to a center hub.

The lockup piston 52 has a radial plate portion 53p and a cylindrical outer portion 53o extending from a radially outer end of the plate portion 53p toward the piston housing member 54 in the axial direction, as best shown in FIG. 10. The cylindrical outer portion 53o of the lockup piston 52 is supported slidably in the axial direction on a radially outer end 55o of the piston housing member 54. Extending axially at a radially inner peripheral end of the plate portion 53p of the lockup piston 52 is a substantially cylindrical flange 53f that is proximate to the rotational axis X relative to the cylindrical outer portion 53o of the lockup piston 52. The cylindrical flange 53f of the lockup piston 52 is rotatable and axially moveable relative to the center hub 24. The lockup piston 52 with the plate portion 53p, the outer portion 53o and the cylindrical flange 53f is an integral (or unitary) component, e.g., made of a single part, for example, by press-forming one-piece metal sheets, or includes separate components fixedly connected together.

Figure 11:
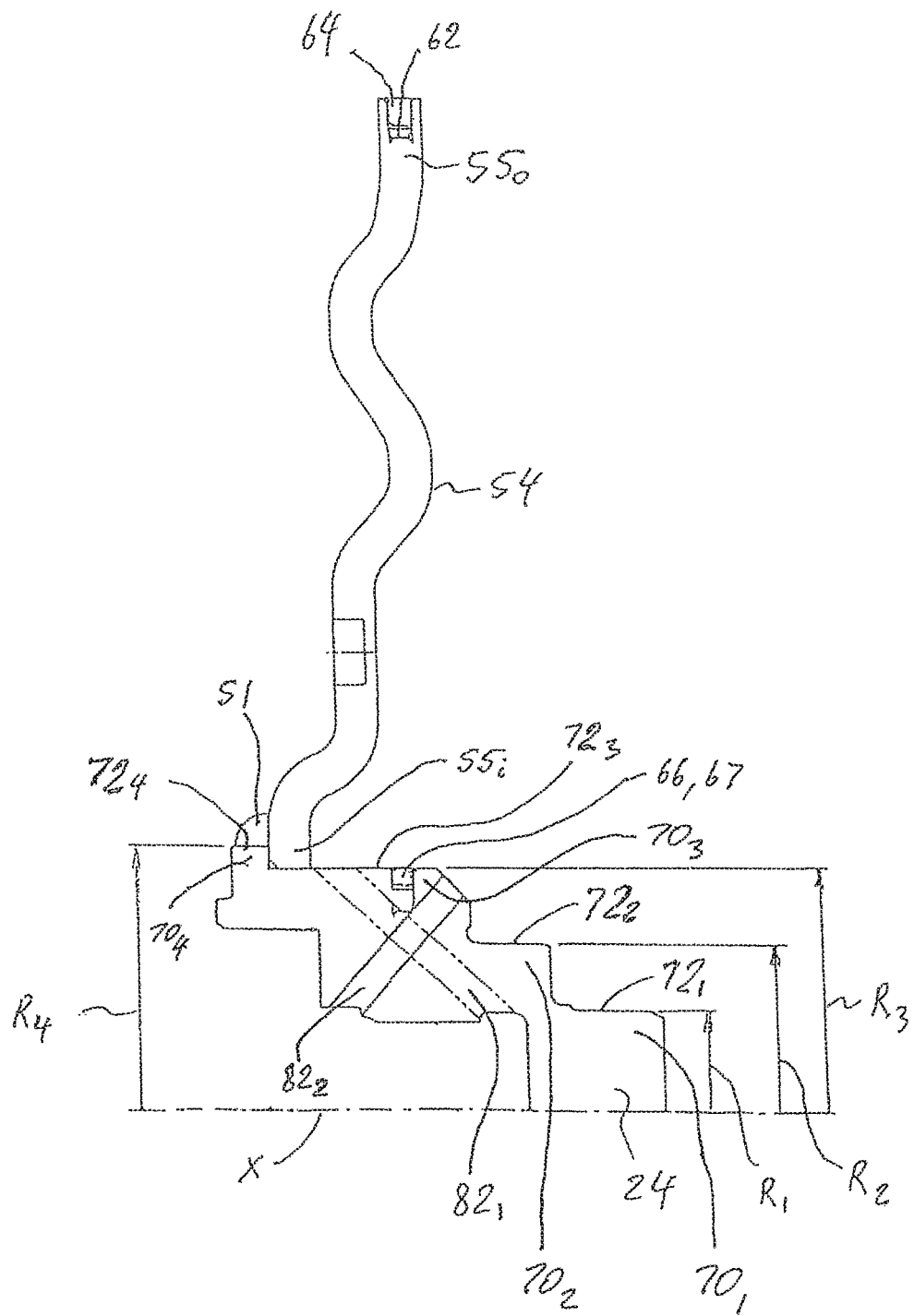
FIG. 11 is a partial sectional view of the hydrokinetic torque coupling device in accordance with the first exemplary embodiment of the present invention, showing the piston housing member mounted to the center hub.

The radially outer end $55o$ of the piston housing member 54 is formed with an annual groove 62 configured to receive an O-ring 64 therein, as best shown in FIGS. 10 and 11. The O-ring 64 is in sliding contact with the cylindrical outer portion $53o$ of the lockup piston 52. The sealing member (e.g., O-ring) 64 creates a seal at the interface of the substantially cylindrical outer portion $53o$ of the lockup piston 52 and the piston housing member 54. Similarly, a radially outer surface of the center hub 24 includes an annular slot (or seal groove) 66 for receiving a sealing member, such as an O-ring 67, as best shown in FIGS. 5, 10 and 11. The sealing member (e.g., O-ring) 67 creates a seal at the interface of the substantially cylindrical flange $53f$ and the center hub 24. As discussed in further detail below, the lockup piston 52 is axially movably relative to the center hub 24 along this interface. Thus, a hydraulically sealed first hydraulic chamber C1 is defined between the lockup piston 52, the piston housing member 54 and the center hub 24. A second hydraulic chamber C2 is defined between the lockup piston 52, the cover shell 20 and the center hub 24.

The center hub 24 has a first step portion $70_1$ defining a substantially cylindrical radially outer first peripheral surface $72_1$ having a first radius $R_1$, a second step portion $70_2$ defining a substantially cylindrical radially outer second peripheral surface $72_2$ having a second radius $R_2$, a third step portion $70_3$ defining a substantially cylindrical outer third peripheral surface $72_3$ having a third radius $R_3$, and a fourth step portion $70_4$ defining a substantially cylindrical radially outer fourth peripheral surface $72_4$ having a fourth radius $R_4$, as best shown in FIGS. 10 and 11.

The center hub 24 is rotatable relative to the turbine hub 40. Accordingly, a radial bearing 76 (such as a metal or plastic bushing) is disposed radially between a radially inner peripheral surface of the center hub 24 and a substantially cylindrical radially outer peripheral surface of the turbine hub 40, and a thrust bearing 78 (such as a metal or plastic bushing) is disposed axially between the center hub 24 and the turbine hub 40, as best shown in FIGS. 5 and 10.

The first peripheral surface $72_1$ of the first step portion $70_1$ of the center hub 24 is positioned into an engine crankshaft for centering the torque-coupling device 10 during assembly. The second peripheral surface $72_2$ of the second step portion $70_2$ of the center hub 24 centers the cover shell 20 during welding thereof to the center hub 24. The third peripheral surface $72_3$ of the third step portion $70_3$ of the center hub 24 centers the piston 52 and the piston housing 54 and also includes the seal grove 66. A radially inner end $55i$ of the piston housing member 54 is placed on the third peripheral surface $72_3$ of the third step portion $70_3$ in contact with the fourth step portion $70_4$ of the center hub 24 so as to define the axial position of the piston housing member 54 relative to the center hub 24. Then, the piston housing member 54 is non-moveably attached (i.e., fixed) to the fourth step portion $70_4$ of the center hub 24, such as by weld 51. Thus, the piston housing member 54 and the center hub 24 are non-movably (i.e., fixedly) interconnected and sealed together.

The center hub 24 is provided with a first hydraulic channel $82_1$ and a second hydraulic channel $82_2$, both in the form of a cylindrical bore. The first hydraulic channel $82_1$ fluidly interconnects the first hydraulic chamber C1 with a first hydraulic fluid passage. The second hydraulic channel $82_2$ interconnects the second hydraulic chamber C2 with a second hydraulic fluid passage.

The lock-up clutch 16 is closed (or engaged) when the lockup piston 52 is displaced axially toward the cover shell 20 under the effect of hydraulic pressure so as to engage (or clamp) the friction portion 56 of the friction disc 50 between the cover shell 20 and the lockup piston 52. When the lock-up clutch 16 is closed and the friction portion 56 of the friction disc 50 is engaged against the locking surface $12s$ of the cover shell 20 by action of the lockup piston 52, the engine torque is passed from the casing 12 to the friction disc 50. Thus, when under the effect of hydraulic pressure the lockup piston 52 clamps the friction portion 56 of the friction disc 50 between itself and the cover shell 20 of the casing 12, the locking of the lock-up clutch 16 permits direct driving of the driven shaft by the splines 43 on the turbine hub 40 from the casing 12, non-rotatably connected to the crankshaft of the engine of the vehicle, through the torsional vibration damper 18 without jolts, and vibrations from the engine are filtered.

The hydraulic fluid, such as oil, that is supplied under pressure to the first hydraulic chamber C1 through the first hydraulic channel $82_1$, causes the lockup piston 52 to move axially toward the locking surface $12s$ of the cover shell 20 and press the friction disc 50 against the cover shell 20 so that the friction disc 50 frictionally non-rotatably engages the cover shell 20 in a lockup position (or mode). The hydraulic fluid that is supplied under pressure to the second hydraulic chamber C2 through the second hydraulic channel $82_2$, causes the lockup piston 52 to move axially away from the locking surface $12s$ of the cover shell 20 and release the friction disc 50 so that the friction disc 50 frictionally disengages from the cover shell 20 in a non-lockup position (or mode).

A sealing member 80, mounted to a radially inner peripheral surface of the inner ring $45_2$ of the one-way clutch 44, creates a seal at the interface of the inner ring $45_2$ of the one-way clutch 44 and a radially outer sealing surface $40s$ of the turbine hub 40. The sealing member 80 between the inner ring $45_2$ of the one-way clutch 44 of the stator 30 and the turbine hub 40 to prevent the oil leakage from the second hydraulic chamber C2.

A method for assembling the hydrokinetic torque-coupling device 10 is described below. It should be understood that this exemplary method may be practiced in connection with the other embodiments described herein. This exemplary method is not the exclusive method for assembling the turbine assembly described herein. While the methods for assembling the hydrokinetic torque-coupling device 10 may be practiced by sequentially performing the steps as set forth below, it should be understood that the methods may involve performing the steps in different sequences.

The method for assembling the hydrokinetic torque-coupling device 10 is as follows. First, the impeller wheel 26, the turbine wheel 28, the stator 30, and the torsional vibration damper 18 may each be preassembled. The impeller wheel 26 and the turbine wheel 28 are formed by stamping from steel blanks or by injection molding of a polymeric material. The impeller wheel 26, the turbine wheel 28 and the stator 30 subassemblies are assembled together so as to form the torque converter 14. The turbine wheel 28 is non-rotatably secured to the turbine hub 40 by appropriate means, such as by the rivets 42 or welding.

The torsional vibration damper 18 is then added. The first retainer plate 84A with the retainer member 85 is formed by stamping from a steel blank. The second retainer plate 84B is also formed by stamping from a steel blank. Before the torsional vibration damper 16 is assembled, the plate portion 89 of the engagement member 88 is non-moveably attached (i.e., fixed) to the first retainer plate 84A by appropriate means, such as by rivets 48 or welding, as best shown in FIG. 5.

The second elastic members $83_2$ are mounted axially between the first and second retainer plates 84A and 84B, then the first and second retainer plates 84A, 84B are non-movably secured to one another by appropriate means, such as by fasteners (e.g., rivets 87) or welding so as to define the intermediate member 84. At the same time, the second elastic members $83_2$ are mounted angularly between the intermediate member 84 and the output member 33 so as to elastically couple the output member 33 to the intermediate member 84 through the second elastic members $83_2$. Then, the output member 33 is non-rotatably coupled to the turbine hub 40, such as by welding 47, as best shown in FIGS. 3-5.

Next, the annular center hub 24 is provided, and the piston housing member 54 is fixed to the center hub 24, such as by weld 51. Then, the cylindrical flange 53f of the lockup piston 52 is mounted to the center hub 24 so as to be rotatable and axially moveable relative to the center hub 24. At the same time the cylindrical outer portion 53o of the lockup piston 52 is supported slidably in the axial direction on a radially outer end 55o of the piston housing member 54. The lockup piston 52 with the plate portion 53p, the outer portion 53o and the cylindrical flange 53f is an integral (or unitary) component, e.g., made of a single part, for example, by press-forming one-piece metal sheets, or includes separate components fixedly connected together.

Next, the friction disc 50 and the first elastic members $83_1$ are provided. The first elastic members $83_1$ are mounted circumferentially in series relative to each other between the input member 50 and the intermediate member 84 so as to at least partially house the first elastic members $83_1$ within the retainer member 85. Specifically, the first elastic members $83_1$ are mounted circumferentially in series between the driving tabs 58 of the friction disc 50 and the abutment elements 86 of the first retainer plate 84A of the intermediate member 84. Also, the first elastic members $83_1$ are mounted circumferentially in series between the driving tabs 58 of the friction disc 50 and the driven tabs 92 of the engagement member 88 of the intermediate member 84, as illustrated in FIGS. 3, 4, 7, 9A and 9B, so that the radially inner peripheral surface 96 of each of the centering tabs 94 is adjacent to and facing the centering surface 57 of the friction disc 50, as illustrated in FIGS. 2, 7 and 8.

Then, a radially upper end of the cover shell 20 is non-moveably and sealingly secured, such as by welding at 21, to the impeller shell 22 so that the friction disc 50 is disposed axially between the lockup piston 52 and the cover shell 20, as best shown in FIG. 1. Then, a radially lower end of the cover shell 20 is non-moveably and sealingly secured, such as by welding at 25, to the center hub 24, as best shown in FIG. 1. After that, the torque-coupling device 10 is mounted to the driven shaft (i.e., the input shaft of the automatic transmission of the motor vehicle) so that the output hub 40 is splined directly to the transmission input shaft.

Various modifications, changes, and alterations may be practiced with the above-described embodiment, including but not limited to the additional embodiments shown in FIGS. 12-18. In the interest of brevity, reference characters in FIGS. 12-18 that are discussed above in connection with FIGS. 1-11B are not further elaborated upon below, except to the extent necessary or useful to explain the additional embodiments of FIGS. 12-18. Modified components and parts are indicated by the addition of a hundred, two hundreds, etc. digit to the reference numerals of the components or parts.

Figure 12:
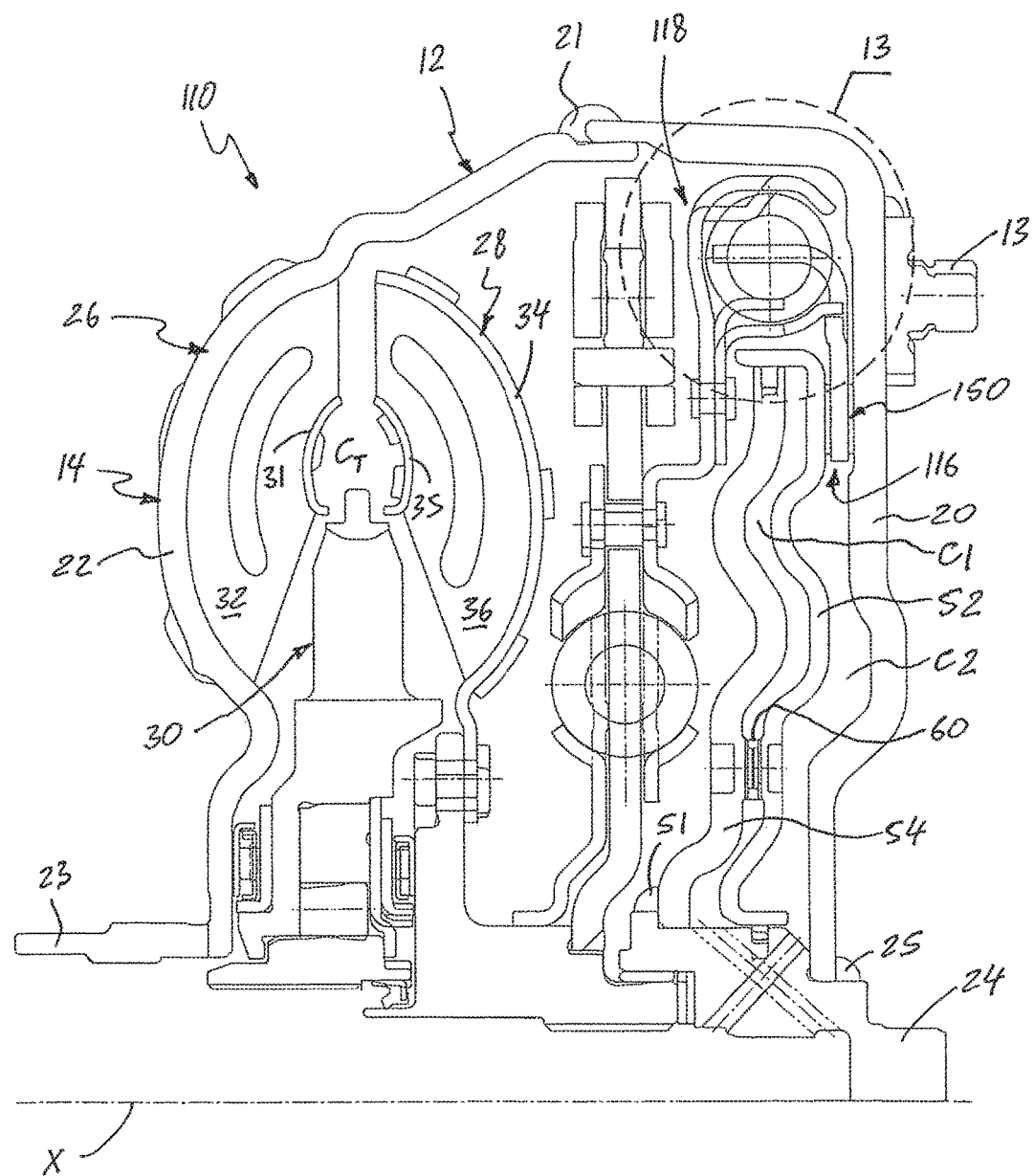
FIG. 12 is a sectional view of a hydrokinetic torque-coupling device in accordance with a second exemplary embodiment of the present invention.
Figure 13:
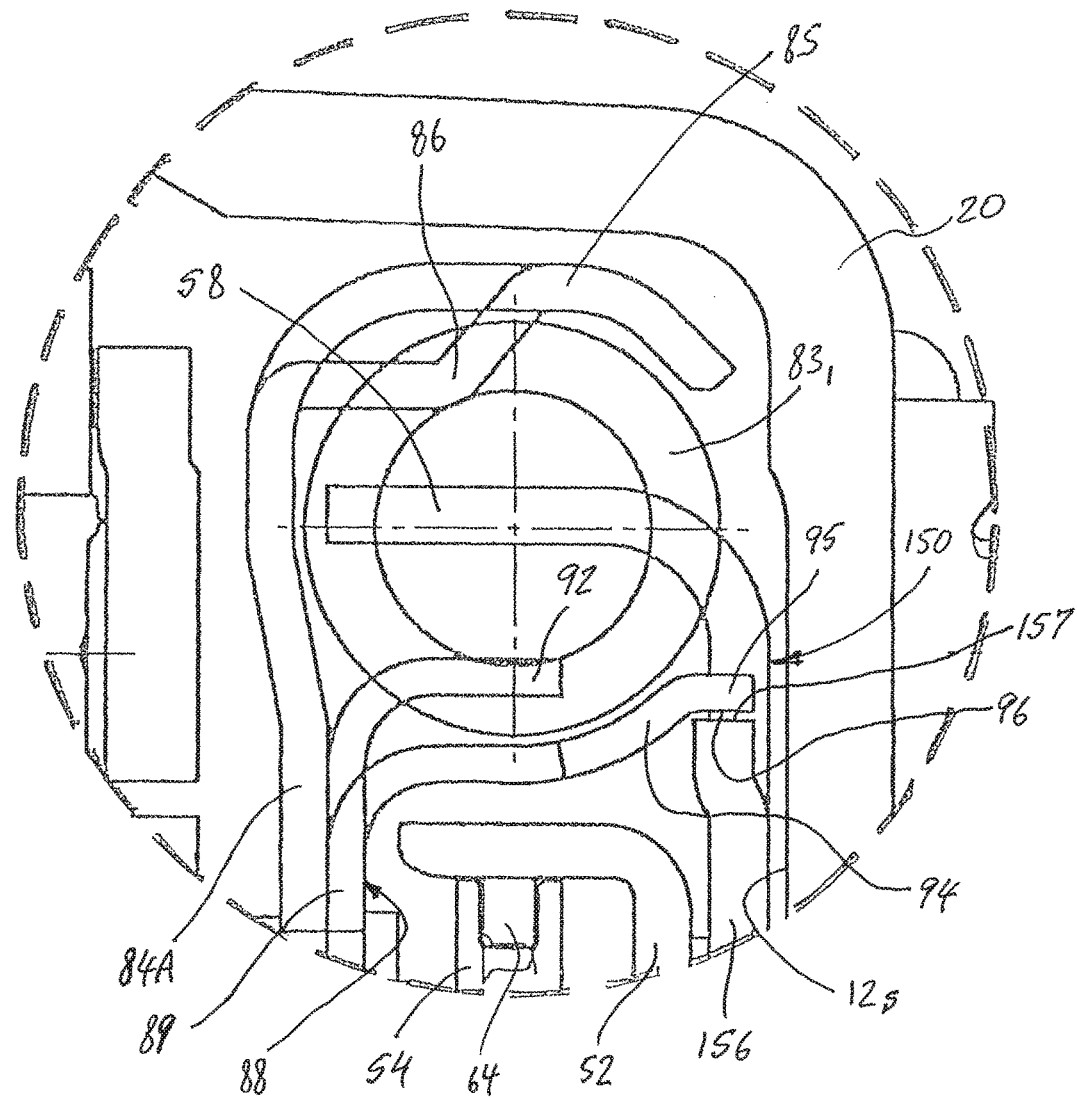
FIG. 13 is an enlarged view of a fragment of the hydrokinetic torque-coupling device shown in the circle "13" of FIG. 12.
Figure 14:
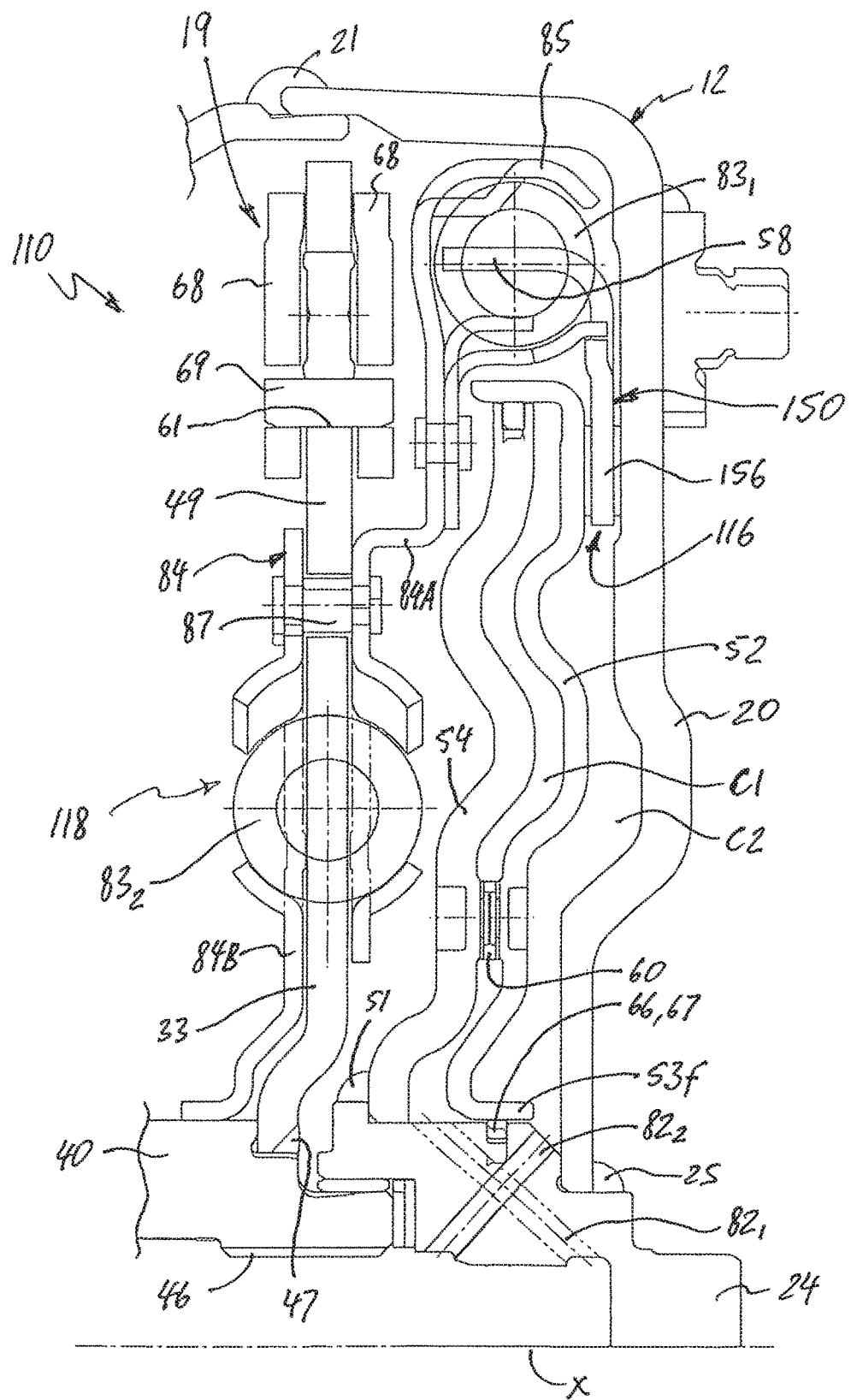
FIG. 14 is a partial sectional view of the hydrokinetic torque-coupling device in accordance with the second exemplary embodiment of the present invention without a torque converter.

In a hydrokinetic torque-coupling device 110 of a second exemplary embodiment illustrated in FIGS. 12 and 13, the friction disc 50 is replaced by a friction disc 150. The hydrokinetic torque-coupling device 110 of FIGS. 12 and 13 corresponds substantially to the hydrokinetic torque-coupling device 10 of FIGS. 1-11, and portions, which differ, will therefore be explained in detail below.

A lock-up clutch 116 of the torque-coupling device 110 includes a friction disc 150, a generally annular lockup piston (or pressure plate) 52, both axially movable to and from the cover shell 20, and an annular piston housing member 54 that is non-moveably attached (i.e., fixed) to the center hub 24 of the cover shell 20 and axially spaced from the cover shell 20 so that the lockup piston 52 is disposed between the piston housing member 54 and the cover shell 20. The friction disc 150 is axially moveable along the rotational axis X to and from a locking surface 12s defined on the cover shell 20 of the casing 12 and best shown in FIG. 13.

The friction disc 150 includes an annular, generally radially orientated friction portion (or friction ring) 156 and one or more driving tabs (or abutment elements) 58 extending axially outwardly from the friction portion 156 of the friction disc 150. Moreover, the driving tabs 58 are equiangularly and equidistantly spaced from each other. The friction portion 156 of the first exemplary embodiment is in the form of a flat (i.e., planar) annular ring. The friction disc 150 with the friction portion 156 and the driving tabs 58 is preferably an integral (or unitary) part, e.g., made of a single or unitary component, but may be separate components fixedly connected together. Preferably, the driving tabs 58 are integrally press-formed on the friction disc 150.

Figure 16:
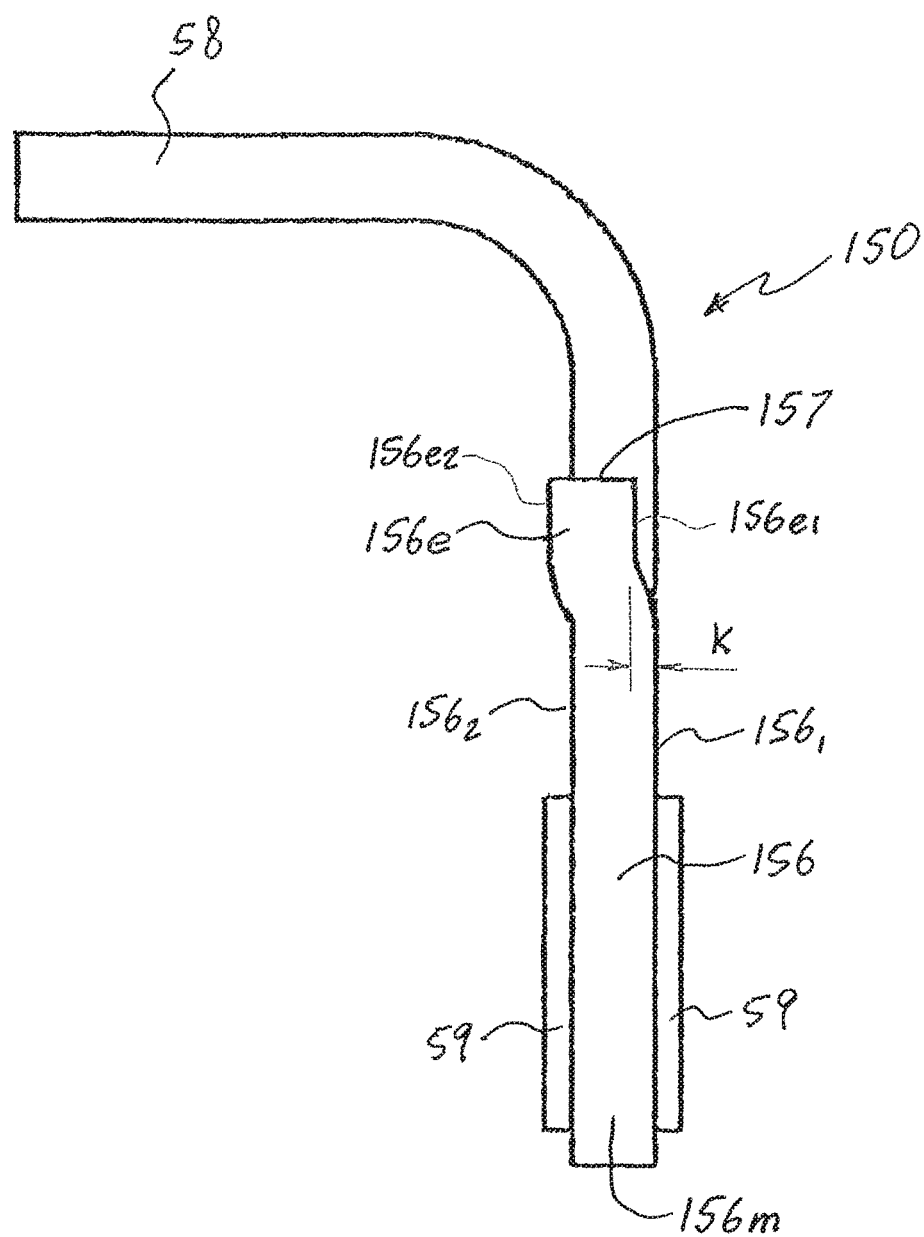
FIG. 16 is a sectional view of the friction disc in accordance with the second exemplary embodiment of the present invention.
Figure 17:
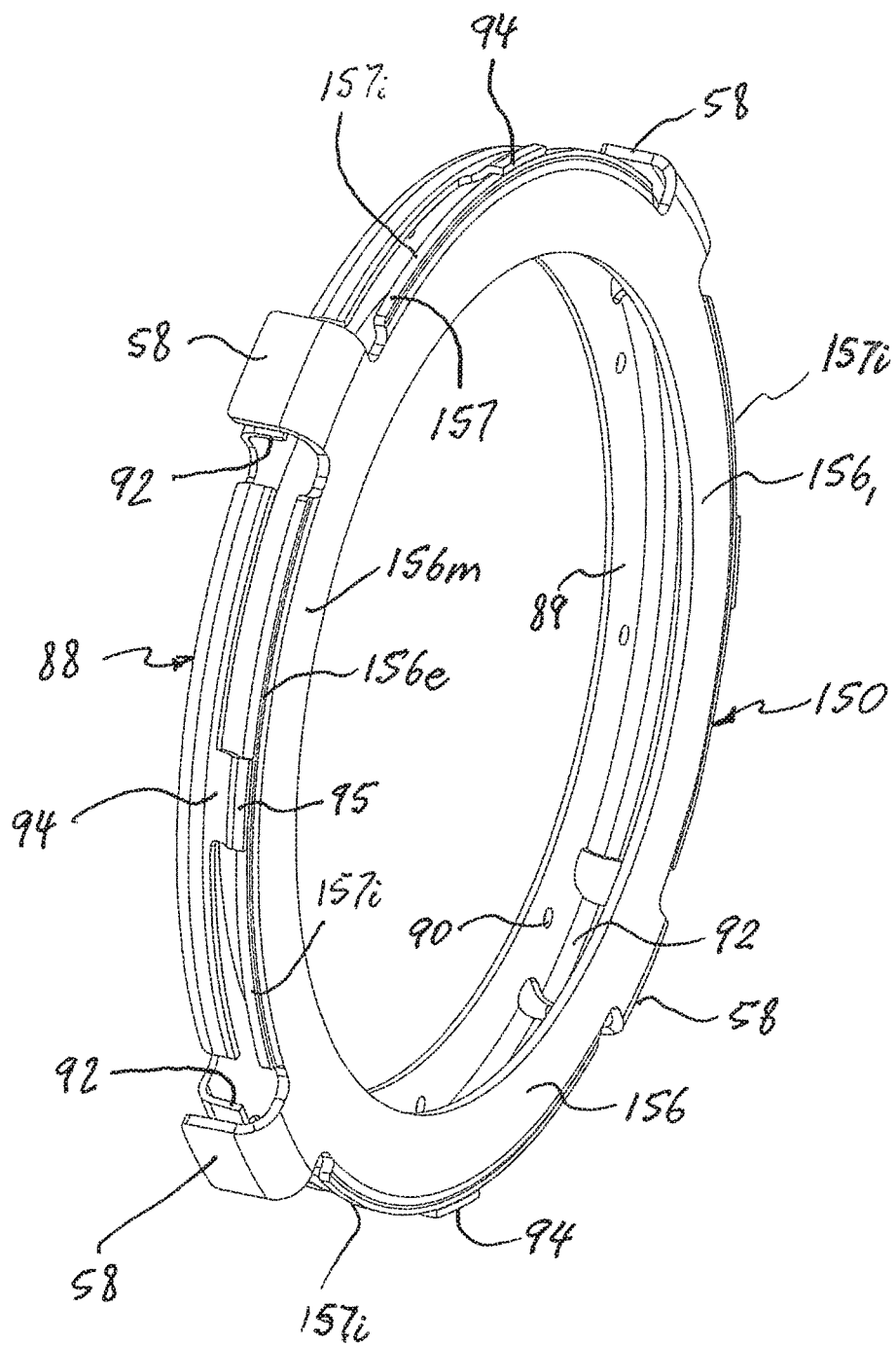
FIG. 17 is a perspective view of an engagement member of the torsional vibration damper and the friction disc in accordance with the second exemplary embodiment of the present invention.
Figure 18:
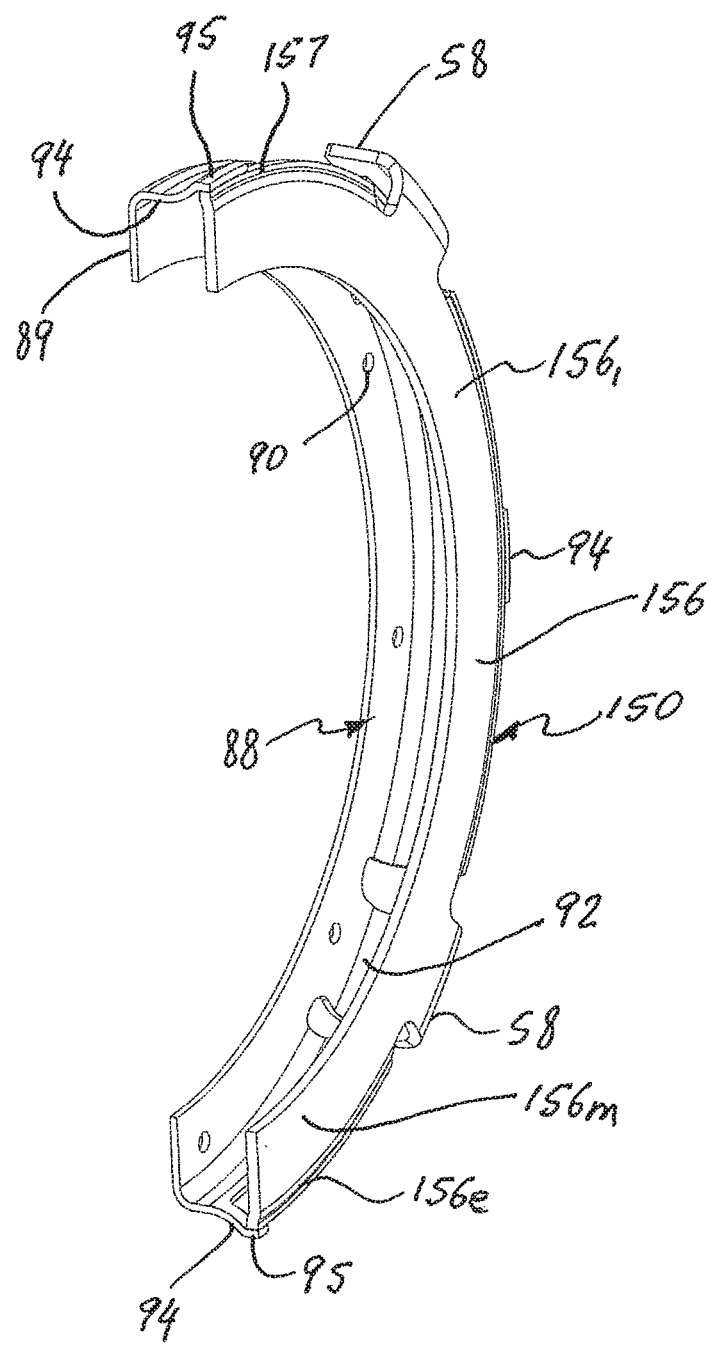
FIG. 18 is a partial perspective view of the engagement member of the torsional vibration damper and the friction disc in accordance with the second exemplary embodiment of the present invention.

As best shown in FIGS. 16-18, the friction portion 156 of the second exemplary embodiment includes an annular main portion 156m and a radially outer end 156e bent toward the driving tabs 58 so that the radially outer end 156e of the friction ring 156 is axially offset from the main portion 156m of the friction ring 156 in the direction away from the cover shell 20.

The main portion 156m of the friction ring 156 is in the form of a flat (i.e., planar) annular ring. The friction disc 150 with the friction portion 156 and the driving tabs 58 is preferably an integral (or unitary) part, e.g., made of a single or unitary component, but may be separate components fixedly connected together. Preferably, the driving tabs 58 are integrally press-formed on the friction disc 150.

Figure 15:
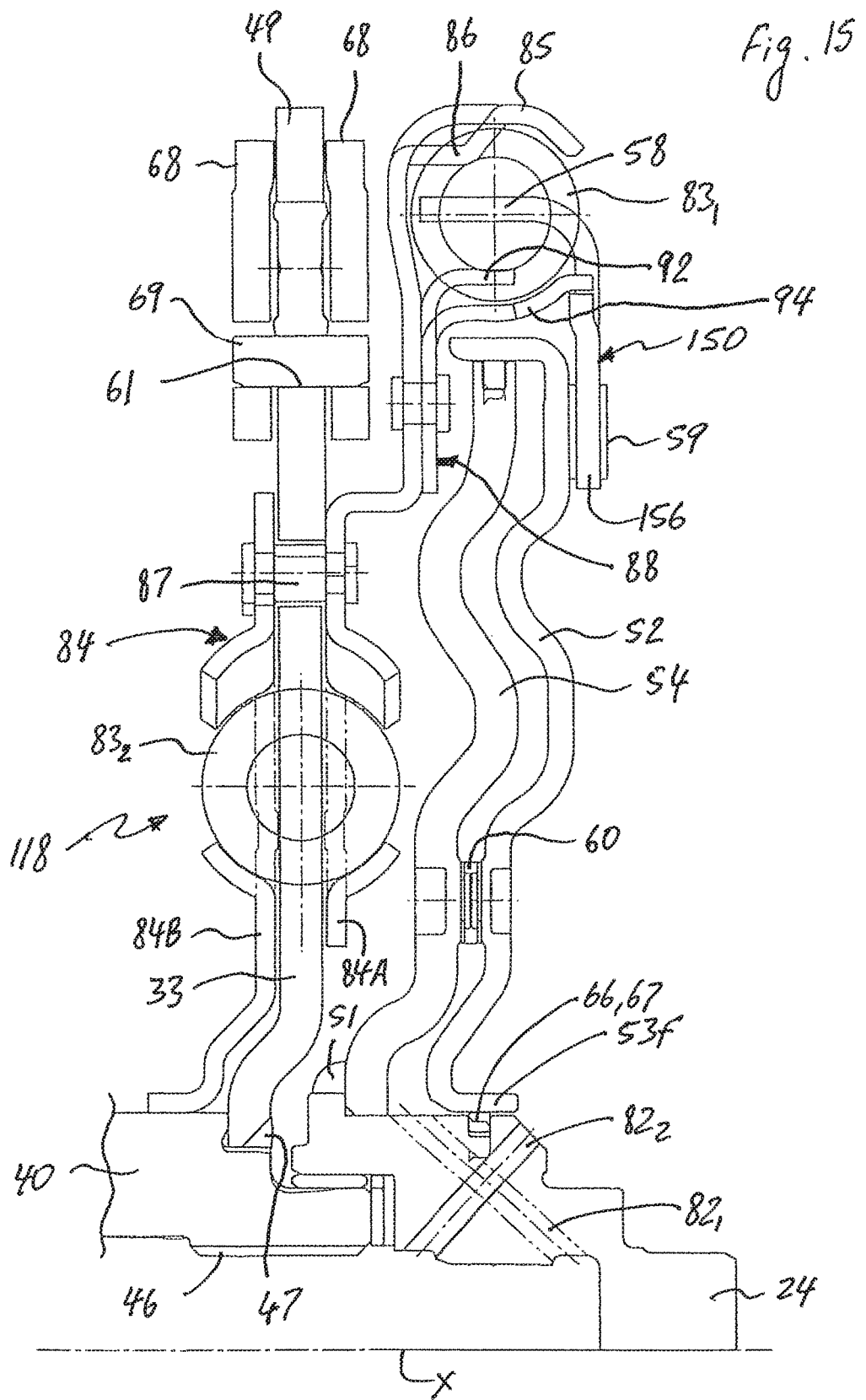
FIG. 15 is a partial sectional view of the hydrokinetic torque coupling device in accordance with the second exemplary embodiment of the present invention, showing a torsional vibration damper and a lockup clutch without a casing.

The annular main portion 156m of the friction portion 156 of the friction disc 150 has axially opposite first and second friction faces $156_1$ and $156_2$, respectively, best shown in FIG. 16. The first friction face $156_1$ of the friction disc 150 (defining an engagement surface of the friction disc 50) faces the locking surface 12s defined on the cover shell 20 of the casing 12. An annular friction liner 59 is attached to each of the friction faces $156_1$ and $156_2$ of the friction disc 150, such as by adhesive bonding, as shown in FIG. 16. Similarly, the bent radially outer end 156e of the friction ring 156 has axially opposite first and second friction faces $156e_1$ and $156e_2$, respectively, best shown in FIG. 16. The first friction face $156e_1$ of the bent radially outer end 156e of the friction disc 150 faces the locking surface 12s on the cover shell 20 of the casing 12, as shown in FIGS. 15 and 16.

As best shown in FIGS. 16-18, the radially outer end 156e of the friction ring 156 of the friction disc 150 has an annular (e.g., substantially cylindrical), radially outer peripheral surfaces 157, which defines a centering surface of the friction disc 150. The centering surface 157 of the friction disc 150 is interrupted by the driving tabs 58. In fact, the centering surface 157 of the friction disc 150 is defined by a number (four in the second exemplary embodiment of the present invention) of cylindrical or conical segments 157$i$, best shown in FIG. 17.

Moreover, a free, axially outermost distal end 95 of each of the centering tabs 94 of the intermediate member 84 of a torsional vibration damper 118 is adjacent to the centering surface 157 of the friction disc 150. The free distal end 95 of each of the centering tabs 94 has a radially inner peripheral surface 96, best shown in FIG. 13, adjacent to and facing the centering surface 157 of the friction disc 150, as illustrated in FIGS. 13, 17 and 18. Moreover, the radially inner surface 96 of the free distal end 95 of each of the centering tabs 94 is complementary to the centering surface 157 of the friction disc 150. When the friction disc 150 rotates above a certain speed, the centering surface 157 of the friction disc 150 contact the radially inner surface 96 of the free distal end 95 of each of the centering tabs 94, thus centering the friction disc 50 with respect to the intermediate member 84 of the torsional vibration damper 118.

As best shown in FIG. 16, the first friction face $156e_1$ of the radially outer end 156$e$ of the friction ring 156 of the friction disc 150 is axially offset from the first friction face $156_1$ of the main portion 156$m$ of the friction ring 156 of the friction disc 150 in the direction away from the locking surface 12$s$ on the cover shell 20 of the casing 12 by an axial distance k, as best shown in FIG. 16. The axially outermost distal end 95 of each of the centering tabs 94 of the engagement member 88 does not extend beyond the first friction face $156e_1$ of the radially outer end 156$e$ of the friction ring 156 of the friction disc 150 in the axial direction toward the locking surface 12$s$ on the cover shell 20 of the casing 12. Accordingly, an axial distance between the axially outermost distal end 95 of each of the centering tabs 94 and the locking surface 12$s$ on the cover shell 20 of the casing 12 in the torque-coupling device 110 of the second exemplary embodiment of FIGS. 12-18 is greater than the axial distance between the axially outermost distal end 95 of each of the centering tabs 94 and the locking surface 12$s$ on the cover shell 20 of the casing 12 in the torque-coupling device 10 of the first exemplary embodiment of FIGS. 1-11.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for coupling a driving shaft and a driven shaft together, comprising:

a casing rotatable about a rotational axis and having a locking surface;

an impeller wheel coaxially aligned with the rotational axis and comprising an impeller shell and impeller blades fixedly attached to the impeller shell;

a turbine wheel coaxially aligned with and hydrodynamically drivable by the impeller wheel, the turbine wheel comprising a turbine shell and turbine blades fixedly attached to the turbine shell;

a lockup piston axially movable toward and away from the locking surface of the casing to position the hydrokinetic torque coupling device into and out of a lockup mode;

a friction disc axially moveable along the rotational axis to and from the locking surface of the casing, the friction disc including a generally radially orientated friction ring disposed axially between the lockup piston and the locking surface of the casing, and at least one driving tab; and a torsional vibration damper comprising an input member in the form of the friction disc, a plurality of circumferentially acting first torque transmitting elastic members and an engagement member elastically coupled to the friction disc through the first torque transmitting elastic members;

the friction ring of the friction disc having a radially outer peripheral surface defining a centering surface of the friction disc;

wherein the engagement member includes at least one centering tab extending toward the friction ring of the friction disc and having a centering surface disposed adjacent to and facing the centering surface of the friction disc to center the friction disc with respect to the engagement member of the torsional vibration damper.

2. The hydrokinetic torque-coupling device as defined in claim 1, wherein the centering surface of the at least one centering tab is a radially inner peripheral surface of a free, axially outermost distal end of the at least one centering tab of the engagement member of the torsional vibration damper.

3. The hydrokinetic torque-coupling device as defined in claim 1, wherein the at least one centering tab of the engagement member of the torsional vibration damper extends axially outwardly toward the friction ring of the friction disc.

4. The hydrokinetic torque-coupling device as defined in claim 1, wherein the at least one driving tab of the friction disc extends axially outwardly from the friction ring of the friction disc.

5. The hydrokinetic torque-coupling device as defined in claim 1, wherein the casing comprises axially opposite impeller and cover shells non-moveably secured to each other, and wherein the cover shell defines the locking surface.

6. The hydrokinetic torque-coupling device as defined in claim 1, wherein the friction ring of the friction disc includes an annular main portion and a radially outer end unitary with the main portion, and wherein the radially outer peripheral surface of the friction ring of the friction disc is defined by the radially outer end of the friction ring of the friction disc.

7. The hydrokinetic torque-coupling device as defined in claim 6, wherein the radially outer end of the friction ring is coplanar with the main portion of the friction ring.

8. The hydrokinetic torque-coupling device as defined in claim 6, wherein the radially outer end of the friction ring is axially offset from the main portion of the friction ring in the direction away from the locking surface of the casing.

9. The hydrokinetic torque-coupling device as defined in claim 1, wherein the at least one driving tab of the friction disc engages the first torque transmitting elastic members so as to drivingly connect the friction disc to the engagement member of the torsional vibration damper.

10. The hydrokinetic torque-coupling device as defined in claim 1, wherein the torsional vibration damper further comprises an intermediate member non-rotatably connected to the engagement member, a plurality of circumferentially acting second torque transmitting elastic members and an output member elastically coupled to the intermediate member through the second torque transmitting elastic members.

11. The hydrokinetic torque-coupling device as defined in claim 10, further comprising a turbine hub non-rotatably connected to the turbine shell, wherein the intermediate member of the torsional vibration damper is rotatable relative to the turbine hub, and wherein the output member of the torsional vibration damper is non-rotatably connected to the turbine shell.

12. The hydrokinetic torque-coupling device as defined in claim 10, wherein the at least one driving tab of the friction disc engages the first torque transmitting elastic members so as to drivingly connect the friction disc to the intermediate member of the torsional vibration damper, and wherein the second torque transmitting elastic members drivingly connect the intermediate member to the output member of the torsional vibration damper.

13. The hydrokinetic torque-coupling device as defined in claim 10, wherein the intermediate member at least partially houses the second torque transmitting elastic members so as to radially support the second torque transmitting elastic members.

14. The hydrokinetic torque-coupling device as defined in claim 1, further comprising a center hub non-moveably attached to the casing, wherein the lockup piston is mounted to the center hub so as to be axially moveable along the center hub and rotatable relative thereto.

15. The hydrokinetic torque-coupling device as defined in claim 14, further comprising a piston housing member non-moveably attached to the center hub, wherein the lockup piston is axially moveable and non-rotatable relative to the piston housing member.

16. The hydrokinetic torque-coupling device as defined in claim 15, wherein the piston housing member is non-moveably attached to the center hub.

17. The hydrokinetic torque-coupling device as defined in claim 15, further comprising a turbine hub non-rotatably connected to the turbine shell, wherein the turbine hub is rotatable relative to the center hub.

18. A method for assembling a hydrokinetic torque-coupling device for coupling a driving shaft and a driven shaft together, the method comprising the steps of:
providing a friction disc including a generally radially orientated friction ring and at least one driving tab, the friction ring of the friction disc having a radially outer peripheral surface defining a centering surface of the friction disc;
providing a plurality of circumferentially acting first torque transmitting elastic members and an engagement member including at least one centering tab extending toward the friction ring of the friction disc and having a centering surface;
mounting the first torque transmitting elastic members between the friction disc and the engagement member so that the at least one driving tab of the friction disc being elastically coupled to the engagement member through the first torque transmitting elastic members; and
centering the friction disc with respect to the engagement member by positioning the centering surface of the at least one centering tab of the engagement member adjacent to and facing the centering surface of the friction disc.

19. The method for assembling the hydrokinetic torque-coupling device as defined in claim 18, further comprising the steps of:
providing an intermediate member non-rotatably connected to the engagement member, a plurality of circumferentially acting second torque transmitting elastic members and an output member elastically coupled to the intermediate member through the second torque transmitting elastic members; and
non-rotatably connecting to the engagement member to the intermediate member.

20. The method for assembling the hydrokinetic torque-coupling device as defined in claim 19, further comprising the steps of:
providing a turbine wheel and a turbine hub;
non-moveably securing the turbine wheel to the turbine hub; and
non-moveably securing the turbine hub to the output member.

* * * * *